(12) United States Patent
Yu et al.

(10) Patent No.: US 10,841,899 B2
(45) Date of Patent: Nov. 17, 2020

(54) SYSTEM MESSAGE TRANSMISSION APPARATUS, METHOD, AND SYSTEM

(71) Applicant: HUAWEI TECHNOLOGIES CO., LTD., Shenzhen (CN)

(72) Inventors: Yinghui Yu, Beijing (CN); Baokun Shan, Beijing (CN); Chenwan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/971,272

(22) Filed: May 4, 2018

(65) Prior Publication Data
US 2018/0255529 A1 Sep. 6, 2018

Related U.S. Application Data

(63) Continuation of application No. PCT/CN2015/094062, filed on Nov. 6, 2015.

(51) Int. Cl.
H04W 68/02 (2009.01)
H04W 48/10 (2009.01)
H04W 72/12 (2009.01)

(52) U.S. Cl.
CPC .......... *H04W 68/02* (2013.01); *H04W 48/10* (2013.01); *H04W 72/1273* (2013.01); *H04W 72/1289* (2013.01); *H04J 2211/005* (2013.01)

(58) Field of Classification Search
CPC ... H04W 68/02; H04W 28/0289; H04W 4/70; H04W 4/90; H04W 36/22; H04W 48/02;
(Continued)

(56) References Cited

U.S. PATENT DOCUMENTS 9,462,548 B1 * 10/2016 Govindassamy ............................ H04W 52/0209
2013/0115913 A1 * 5/2013 Lin .................. H04W 4/70
455/410
(Continued)

FOREIGN PATENT DOCUMENTS

CN 102215201 A 10/2011
CN 103237350 A 8/2013
(Continued)

OTHER PUBLICATIONS

3GPP TS 36.331 V12.7.0 (Sep. 2015), 3rd Generation Partnership Project;Technical Specification Group Radio Access Network; Evolved Universal Terrestrial Radio Access (E-UTRA);Radio Resource Control (RRC);Protocol specification(Release 12), (Year: 2015).*
(Continued)

Primary Examiner — George Eng
Assistant Examiner — Umair Ahsan
(74) Attorney, Agent, or Firm — Huawei Technologies Co., Ltd.

(57) ABSTRACT

This application relates to the field of wireless communications technologies, and in particular, to a system message transmission technology, so as to resolve a system message update problem of a terminal device with DRX cycle. This application provides a terminal device, including: a receiving module, configured to receive a first system message; and a processing module, configured to: obtain first indication information from the first system message, and update system messages other than the first system message according to the obtained first indication information, where the first system message is periodically sent, and occupies a fixed physical resource location. The first indication information is sent in the first system message instead of a paging message. The terminal device may update the system messages other than the first system message according to the
(Continued)

indication information, thereby updating all system messages.

8 Claims, 16 Drawing Sheets

(58) Field of Classification Search
CPC ...... H04W 48/10; H04W 48/16; Y02D 70/00; Y02D 70/1262; Y02D 70/1264; H04J 2211/005
See application file for complete search history.

(56) References Cited

U.S. PATENT DOCUMENTS

| | | | |
|---|---|---|---|
| 2015/0282248 A1* | 10/2015 | Lee | H04W 72/10 370/329 |
| 2016/0227472 A1 | 8/2016 | Qiu et al. | |
| 2017/0105166 A1* | 4/2017 | Lee | H04W 68/005 |
| 2019/0110179 A1* | 4/2019 | Lee | H04W 68/005 |

FOREIGN PATENT DOCUMENTS

| | | |
|---|---|---|
| CN | 104255079 A | 12/2014 |
| JP | 2017510224 A | 4/2017 |
| JP | 2018526898 A | 9/2018 |
| WO | 2014197501 A1 | 12/2014 |
| WO | 2015066645 A1 | 5/2015 |
| WO | 2015066882 A1 | 5/2015 |
| WO | 2015143244 A1 | 9/2015 |

OTHER PUBLICATIONS

"3GPP TS 36.331 V12.7.0 (Sep. 2015), 3rd Generation Partnership Project;Technical Specification Group Radio Access Network;Evolved Universal Terrestrial Radio Access (E-UTRA);Radio Resource Control (RRC);Protocol specification (Release 12), Technical Specification, 453 pages".
Samsung, Narrowband loT—Broadcast Channel Design [online], 3GPP TSG-RAN WG1#82b R1-155511, Oct. 9, 2015, 5 pages.
Samsung Electronics, Co. Ltd., Discussion on System Information Design [online], 3GPP TSG-RAN WG2#91bis R2-154528, Oct. 9, 2015, 3 pages.
Mediatek Inc. (Session Chair),"Report of the LTE breakout session (NB-IoT)",3GPP TSG RAN WG2 #91 bis, R2-154893,Malm , Sweden, Oct. 5-9, 2015, total 18 pages.
LG Electronics,"SI change notification for Rel-13 MTC UEs",3GPP TSG-RAN WG2 #91,R2-153247,Beijing, China, Aug. 24-28, 2015, total 2 pages.

* cited by examiner

FIG. 10

FIG. 11

FIG. 12

FIG. 13

S1401: A first terminal device receives a first system message of a cell in which the first terminal device is located S1402: The first terminal device obtains first indication information from the first system message, where the first indication information includes information used for updating system messages other than the first system message S1403: The first terminal device updates the system messages other than the first system message according to the obtained first indication information

FIG. 14

FIG. 22
FIG. 23
FIG. 24
FIG. 25
S2601: A first terminal device receives a paging message of a cell in which the first terminal device is located, where the paging message includes system message update indication information
S2602: The first terminal device updates a system message according to the system message update indication information
FIG. 26

SYSTEM MESSAGE TRANSMISSION APPARATUS, METHOD, AND SYSTEM

CROSS-REFERENCE TO RELATED APPLICATIONS

This application is a continuation of International Application No. PCT/CN2015/094062, filed on Nov. 6, 2015, the disclosure of which is hereby incorporated by reference in its entirety.

TECHNICAL FIELD

This application relates to the field of wireless communications technologies, and in particular, to a system message transmission apparatus, method, and system.

BACKGROUND

Internet of things (IOT) implements communication between objects. Compared with conventional communication between people, Internet of things imposes a higher requirement on energy consumption of a terminal device. Energy consumption of the terminal device needs to be reduced as much as possible, to ensure an extra-long standby time of the device, and reduce labor costs of replacing a battery.

Considering that Internet of things communication features a low service rate and a long period, a relatively long discontinuous reception (DRX) cycle is configured for a terminal device in an idle state, so as to save electricity and extend a standby time of the terminal device.

Internet of things may be implemented based on a cellular network. For example, Internet of things communication is implemented based on a Long Term Evolution (LTE) system. In the LTE system, a paging message is usually used to notify a terminal device of a system message (System Information) change, that is, in a system message modification period, the paging message is sent to notify the terminal device that a system message is to change in a next system message modification period, and the terminal device reads a changed system message in the next system message modification period.

Generally, as shown in FIG. 1, a system message modification period in the LTE system is a paging message sending period, that is, an integer multiple of a paging period. In this case, when a system message changes, a terminal device in a radio resource control idle (RRC_IDLE) state (idle state for short) may learn that the system message is to change provided that the terminal device reads a paging message in a system message modification period, and reads the system message in a next system message modification period, to complete a system message update. After successfully completing the system message update in the system message modification period, the terminal device does not need to read a system message that is subsequently sent in the period.

However, in a wireless communication process such as Internet of things communication, when a DRX cycle of a terminal device is longer than a system message modification period, the terminal device may fail to normally update a system message.

SUMMARY

In view of the above, this application provides a system message transmission apparatus and method, and a system, so as to resolve a problem that a terminal device may fail to normally update a system message.

According to a first aspect, this application provides a terminal device, including:
a receiving module, configured to receive a first system message of a cell in which the terminal device is located; and
a processing module, configured to: obtain first indication information from the first system message received by the receiving module, where the first indication information includes information used for updating system messages other than the first system message; and update the system messages other than the first system message according to the obtained first indication information, where
the first system message is periodically sent, and occupies a fixed physical resource location.

According to a second aspect, this application provides a network device, including:
a processing module, configured to determine a first system message, where the first system message includes first indication information, and the first indication information includes information used for updating system messages other than the first system message; and
a sending module, configured to send, in a cell, the first system message determined by the processing module, where
the first system message is periodically sent, and occupies a fixed physical resource location.

According to a third aspect, this application provides a system message update method, including:
receiving, by a first terminal device, a first system message of a cell in which the first terminal device is located;
obtaining, by the first terminal device, first indication information from the first system message, where the first indication information includes information used for updating system messages other than the first system message; and
updating, by the first terminal device, the system messages other than the first system message according to the obtained first indication information, where
the first system message is periodically sent, and occupies a fixed physical resource location.

According to a fourth aspect, this application provides a system message update method, including:
determining, by a network device, a first system message, where the first system message includes first indication information, and the first indication information includes information used for updating system messages other than the first system message; and
sending, by the network device, the determined first system message in a cell, where
the first system message is periodically sent, and occupies a fixed physical resource location.

According to a fifth aspect, this application provides a wireless communications system, including:
a network device, configured to send a first system message in a cell, where the first system message includes first indication information, and the first indication information includes information used for updating system messages other than the first system message; and
a terminal device, configured to: receive the first system message sent by the network device, obtain the first indication information from the first system message, and update the system messages other than the first system message according to the obtained first indication information, where
the first system message is periodically sent, and occupies a fixed physical resource location.

In any one of the foregoing aspects, the first indication information is sent in the first system message instead of a paging message. Because the first system message is periodically sent, and occupies the fixed physical resource location, the terminal device may update the system messages other than the first system message according to the indication information, thereby updating all system messages. In comparison with a current solution in which a system message change is learned by using a paging message, it is avoided that the terminal device may fail to receive a paging message used for indicating a system message change and further cannot update a system message because a DRX cycle of the terminal device is longer than a system message modification period.

With reference to any one of the foregoing aspects, in a first possible implementation, the system messages other than the first system message include a second system message, at least two third system messages, and the at least two third system messages include at least one normal third system message and at least one activation-related third system message;

the second system message includes scheduling information of the at least two third system messages; and the activation-related third system message includes a system message that needs be obtained by the terminal device in the cell when a particular function of the cell is activated, and the normal third system message is a third system message in the at least two third system messages other than the activation-related third system message.

The third system messages are further classified into the activation-related third system message and the normal third system message. Therefore, these system messages may be updated in a more flexible indication manner, and a method for updating a system message by the terminal device is more flexible.

With reference to the first possible implementation of any one of the foregoing aspects, in a second possible implementation, when the first indication information includes second indication information, the second indication information is used to indicate a configuration version of a combination of the second system message and the at least one normal third system message that are currently used in the cell, and in one system message update period, for an update on any one or more system messages in the second system message and the at least one normal third system message, the configuration version changes once, if the configuration version indicated by the second indication information is different from the configuration version recorded by the terminal device, the terminal device updates the second system message; or if the configuration version indicated by the second indication information is the same as the configuration version recorded by the terminal device, the terminal device determines that the second system message does not need to be updated.

The terminal device may determine, according to the second indication information, whether a system message needs to be read, thereby reducing energy consumption and alleviating processing load.

With reference to the second possible implementation of any one of the foregoing aspects, in a third possible implementation, when the second system message includes at least one piece of third indication information, and one piece of third indication information is corresponding to one normal third system message and is used to indicate whether the corresponding normal third system message is updated relative to a latest change of the configuration version, the at least one piece of third indication information is obtained from the second system message after the second system message is updated; and if the configuration version indicated by the second indication information is different from the configuration version recorded by the terminal device, and there is no other different configuration version between the two configuration versions, the following operation is performed:

if each piece of third indication information in the at least one piece of third indication information indicates that the corresponding normal third system message is not updated relative to the latest change of the configuration version, determining that no system message in the at least one normal third system message needs to be updated; or if one or more pieces of third indication information in the at least one piece of third indication information indicate that the corresponding normal third system message is updated relative to the latest change of the configuration version, for each updated normal third system message, controlling, according to scheduling information that is of the normal third system message and that is in the updated second system message, the receiving module to read the normal third system message.

For each normal third system message, whether the message is updated is indicated. On the one hand, the terminal device may update a system message only for an updated normal third system message, thereby reducing energy consumption and alleviating processing load. On the other hand, when determining, according to each piece of third indication information, none of normal third system messages is updated, the terminal device may determine that a normal third system message does not need to be updated, thereby reducing energy consumption and alleviating processing load.

With reference to the third possible implementation of any one of the foregoing aspects, in a fourth possible implementation, if there is another different configuration version between the configuration version indicated by the second indication information and the configuration version recorded by the terminal device, for each normal third system message, the receiving module is controlled, according to the scheduling information that is of the normal third system message and that is in the updated second system message, to read the normal third system message.

If there is another different configuration version between the configuration version indicated by the second indication information and the configuration version recorded by the terminal device, it cannot be correctly determined, only according to the third indication information, whether a corresponding normal third system message is updated. In this case, the terminal device needs to update all normal third system messages.

With reference to any one of the first to the fourth possible implementations of any one of the foregoing aspects, in a fifth possible implementation, when the first indication information further includes at least one piece of fourth indication information, and one piece of fourth indication information is corresponding to one activation-related third system message and is used to indicate whether the terminal device in the cell needs to update the corresponding activation-related third system message, if the fourth indication information indicates that the terminal device in the cell needs to update the corresponding activation-related third system message, the terminal device updates the corresponding activation-related third system message; or if the fourth indication information indicates that the terminal device in the cell does not need to update the corresponding activation-related third system message, the terminal device determines that the corresponding activation-related third system message does not need to be updated.

For each activation-related third system message, whether the system message needs to be updated is indicated. In addition, the activation-related third system message is a system message that needs to be obtained by the terminal device in the cell when the particular function of the cell is activated. Therefore, when whether the activation-related third system message needs to be updated is being indicated, the terminal device is notified that the particular function of the cell is activated. Different from the normal third system message, the terminal device does not need to determine, with reference to other indication information, whether a system message needs to be updated. When the fourth indication information indicates that the corresponding activation-related third system message needs to be updated, the terminal device determines that the activation-related third system message needs to be updated, or when the fourth indication information indicates that the corresponding activation-related third system message does not need to be updated, the terminal device determines that the activation-related third system message does not need to be updated. This is different from the foregoing mechanism of updating the normal third system message.

According to a sixth aspect, this application provides a terminal device, including:

a receiving module, configured to receive a first system message of a cell in which the terminal device is located, where system messages of the cell include the first system message, a second system message, and at least one third system message; the first system message is periodically sent, and occupies a fixed physical resource location; the second system message includes scheduling information of the at least one third system message; and the at least one third system message includes a paging-related system message; and a processing module, configured to: obtain first indication information from the first system message received by the receiving module, where the first indication information is used to indicate whether a paging-related system message is updated; and if the first indication information indicates that the paging-related system message is not updated, control the receiving module to receive a paging message according to a recorded paging-related system message, and update a system message according to second indication information related to a system message update in the paging message received by the receiving module.

According to a seventh aspect, this application provides a network device, including:

a processing module, configured to determine a first system message, where the first system message includes first indication information, and the first indication information is used to indicate whether a paging-related system message is updated; and a sending module, configured to send, in a cell, the first system message determined by the processing module, where the processing module is further configured to determine a paging message, where the paging message includes second indication information related to a system message update; and the sending module is further configured to send, in the cell, the paging message determined by the processing module, where system messages of the cell include the first system message, a second system message, and at least one third system message; the first system message is periodically sent, and occupies a fixed physical resource location; the second system message includes scheduling information of the at least one third system message; and the at least one third system message includes the paging-related system message.

According to an eighth aspect, this application provides a system message update method, including:

receiving, by a first terminal device, a first system message of a cell in which the first terminal device is located, where system messages of the cell include the first system message, a second system message, and at least one third system message; the first system message is periodically sent, and occupies a fixed physical resource location; the second system message includes scheduling information of the at least one third system message; and the at least one third system message includes a paging-related system message;

obtaining, by the first terminal device, first indication information from the first system message, where the first indication information is used to indicate whether a paging-related system message is updated; and if the first indication information indicates that the paging-related system message is not updated, receiving, by the first terminal device, a paging message according to a recorded paging-related system message; and updating, by the first terminal device, a system message according to second indication information related to a system message update in the received paging message.

According to a ninth aspect, this application provides a system message update method, including:

determining, by a network device, a first system message, where the first system message includes first indication information, and the first indication information is used to indicate whether a paging-related system message is updated;

sending, by the network device, the determined first system message in a cell;

determining, by the network device, a paging message, where the paging message includes second indication information related to a system message update; and sending, by the network device, the determined paging message in the cell, where system messages of the cell include the first system message, a second system message, and at least one third system message; the first system message is periodically sent, and occupies a fixed physical resource location; the second system message includes scheduling information of the at least one third system message; and the at least one third system message includes the paging-related system message.

According to a tenth aspect, this application provides a wireless communications system, including:

a network device, configured to send a first system message in a cell, where the first system message includes first indication information, and the first indication information is used to indicate whether a paging-related system message is updated; and send a paging message in the cell, where the paging message includes second indication information related to a system message update; and a terminal device, configured to: receive the first system message sent by the network device in the cell, obtain the first indication information from the first system message, and if the first indication information indicates that the paging-related system message is not updated, receive the paging message according to a recorded paging-related system message, and update a system message according to the second indication information related to a system message update in the received paging message, where system messages of the cell include the first system message, a second system message, and at least one third system message; the first system message is periodically sent, and occupies a fixed physical resource location; the second system message includes scheduling information of the at least one third system message; and the at least one third system message includes the paging-related system message.

In any one of the sixth aspect to the tenth aspect, the first system message periodically sent by the network device indicates whether the paging-related system message is updated. If the paging-related system message is not updated, the terminal device may still normally receive the paging message according to the recorded paging-related system message, so as to further obtain the indication information related to a system message update from the paging message, and update a system message according to the indication information obtained from the paging message. In this way, even if a DRX cycle is longer than a system message update period, because it is learned that the system message related to the paging message is not updated, the terminal device can still correctly receive the paging message according to the recorded paging-related system message, so as to successfully obtain the indication information related to a system message update from the paging message, and successfully update a system message.

With reference to any one of the sixth aspect to the tenth aspect, the second indication information includes third indication information, fourth indication information, and at least one piece of fifth indication information;

the third indication information is used to indicate a configuration version of a combination of the second system message and the at least one third system message that are currently used in the cell, and in one system message update period, for an update on any one or more system messages in the second system message and the at least one third system message, the configuration version changes once;

the fourth indication information is used to indicate whether the second system message is updated relative to a latest change of the configuration version; and one piece of fifth indication information is corresponding to one third system message and is used to indicate whether the corresponding third system message is updated relative to the latest change of the configuration version.

By using the third indication information, the network device may notify the terminal device of change statuses of the second system message and the third system message in multiple system message update periods. The terminal device may determine, with reference to the third indication information and the fifth indication information, whether the third system message needs to be updated, and determine a manner of updating the third indication information.

By using the fourth indication information, the network device may notify the terminal device whether the second system message including the scheduling information of the third system message is updated. In this way, the terminal device may determine, with reference to the third indication information and the fourth indication information, whether the second system message needs to be updated, and update the third system message according to a recorded second system message or an updated second system message.

With reference to the first possible implementation of any one of the sixth aspect to the tenth aspect, in a second possible implementation, if the configuration version indicated by the third indication information is the same as the configuration version recorded by the terminal device, a system message does not need to be updated; or if the configuration version indicated by the third indication information is different from the configuration version recorded by the terminal device, and there is no other different configuration version between the two configuration versions, when the fourth indication information indicates that the second system message is updated relative to the latest change of the configuration version, the second system message is updated; or when the fourth indication information indicates that the second system message is not updated relative to the latest change of the configuration version, the second system message does not need to be updated.

With reference to the second possible implementation of any one of the sixth aspect to the tenth aspect, in a third possible implementation, if the configuration version indicated by the third indication information is different from the configuration version recorded by the terminal device, and there is no other different configuration version between the two configuration versions, when each piece of fifth indication information in the at least one piece of fifth indication information indicates that the corresponding third system message is not updated relative to the latest change of the configuration version, the terminal device determines that no system message in the at least one third system message needs to be updated; or when one or more pieces of fifth indication information in the at least one piece of fifth indication information indicate that the corresponding third system message is updated relative to the latest change of the configuration version, the terminal device updates each updated third system message.

With reference to the first possible implementation of any one of the sixth aspect to the tenth aspect, in a fourth possible implementation, if the configuration version indicated by the third indication information is different from the configuration version recorded by the terminal device, and there is no other different configuration version between the two configuration versions, the terminal device updates the second system message, and updates each third system message according to scheduling information that is of the at least one third system message and that is in the updated second system message.

With reference to any one of the sixth aspect to the tenth aspect, in a fifth possible implementation, if the first indication information indicates that the paging-related system message is updated, the second system message is updated;

sixth indication information and at least one piece of seventh indication information are obtained from the second system message, where the sixth indication information is used to indicate a configuration version of a combination of the second system message and the at least one third system message that are currently used in the cell, and in one system message update period, for an update on any one or more system messages in the second system message and the at least one third system message, the configuration version changes once; and one piece of seventh indication information is corresponding to one third system message and is used to indicate whether the corresponding third system message is updated relative to a latest change of the configuration version; and a system message is updated according to the sixth indication information and the at least one piece of seventh indication information.

With reference to the fifth possible implementation of any one of the sixth aspect to the tenth aspect, in a sixth possible implementation, if the configuration version indicated by the sixth indication information is different from the configuration version recorded by the terminal device, and there is no other different configuration version between the two configuration versions, for each updated third system message indicated by the at least one piece of seventh indication information, the third system message is updated; or if the configuration version indicated by the sixth indication information is different from the configuration version recorded by the terminal device, and there is another different configuration version between the two configuration versions, each system message in the at least one third system message is updated.

When the paging-related system message changes, the terminal device first updates the second system message, and updates the third system message according to the sixth indication information and the seventh indication information in the second system message.

According to an eleventh aspect, this application provides a terminal device, including:

a receiving module, configured to receive a paging message of a cell in which the terminal device is located, where the paging message includes system message update indication information, and for each system message in a first system message, a second system message, and at least one third system message, the system message update indication information indicates whether a terminal device in the cell in which the terminal device is located needs to update the system message; and a processing module, configured to update a system message according to the system message update indication information received by the receiving module, where the first system message is periodically sent, and occupies a fixed physical resource location; and the second system message includes scheduling information of the at least one third system message.

According to a twelfth aspect, this application provides a network device, including:

a processing module, configured to determine a paging message, where the paging message includes system message update indication information; and a sending module, configured to send, in a cell, the paging message determined by the processing module, where for each system message in a first system message, a second system message, and at least one third system message, the system message update indication information indicates whether a terminal device in the cell needs to update the system message; and the first system message is periodically sent, and occupies a fixed physical resource location; and the second system message includes scheduling information of the at least one third system message.

According to a thirteenth aspect, this application provides a system message update method, including:

receiving, by a first terminal device, a paging message of a cell in which the first terminal device is located, where the paging message includes system message update indication information, and for each system message in a first system message, a second system message, and at least one third system message, the system message update indication information indicates whether a terminal device in the cell in which the first terminal device is located needs to update the system message; and updating, by the first terminal device, a system message according to the system message update indication information, where the first system message is periodically sent, and occupies a fixed physical resource location; and the second system message includes scheduling information of the at least one third system message.

According to a fourteenth aspect, this application provides a system message update method, including:

determining, by a network device, a paging message, where the paging message includes system message update indication information; and sending, by the network device, the paging message in a cell, where for each system message in a first system message, a second system message, and at least one third system message, the system message update indication information indicates whether a terminal device in the cell needs to update the system message; and the first system message is periodically sent, and occupies a fixed physical resource location; and the second system message includes scheduling information of the at least one third system message.

According to a fifteenth aspect, this application provides a wireless communications system, including:

a network device, configured to send a paging message in a cell, where the paging message includes system message update indication information, and for each system message in a first system message, a second system message, and at least one third system message, the system message update indication information indicates whether a terminal device in the cell needs to update the system message; and a first terminal device, configured to: receive the paging message sent by the network device in the cell, and update a system message according to the system message update indication information, where the first system message is periodically sent, and occupies a fixed physical resource location; and the second system message includes scheduling information of the at least one third system message.

In any one of the eleventh aspect to the fifteenth aspect, indication information for each system message is carried in a paging message, and the indication information is used to indicate whether the corresponding system message needs to be updated. The terminal device may determine, according to a specific status of each piece of indication information, how to update a system message. For example, if indication information of a second system message indicates that the second system message does not need to be updated, when updating at least one third system message, a terminal device performs an update only according to a recorded second system message without reading the second system message again, thereby improving system message update efficiency of the terminal device.

According to a sixteenth aspect, this application provides a terminal device, including:

a processing module, configured to: determine that the terminal device needs to receive at least one system message, and for each system message in the at least one system message, determine a start location, a sending period, and a quantity of repetitions that are used for sending the system message by a network device; and a receiving module, configured to: for each system message in the at least one system message, receive the system message according to the start location, the sending period, and the quantity of repetitions that are used for sending the system message by the network device and that are determined by the processing module, where in a time interval between two times of sending a system message, one or more other system messages are sent by the network device.

According to a seventeenth aspect, this application provides a network device, including:

a processing module, configured to: determine that the network device needs to send at least one system message, and for each system message in the determined at least one system message, determine a start location, a sending period, and a quantity of repetitions that are used for sending the system message; and a sending module, configured to: for each system message in the at least one system message determined by the processing module, send the system message according to the determined start location, sending period, and quantity of repetitions that are used for sending the system message, where in a time interval between two times of sending a system message, one or more other system messages are sent.

According to an eighteenth aspect, this application provides a system message receiving method, including:

determining, by a first terminal device, that at least one system message needs to be received;

for each system message in the at least one system message, determining, by the first terminal device, a start location, a sending period, and a quantity of repetitions that are used for sending the system message by a network device; and for each system message in the at least one system message, receiving, by the first terminal device, the system message according to the determined start location, sending period, and quantity of repetitions that are used for sending the system message by the network device, where in a time interval between two times of sending a system message, one or more other system messages are sent by the network device.

According to a nineteenth aspect, this application provides a system message sending method, including:

determining, by a network device, that at least one system message needs to be sent;

for each system message in the at least one system message, determining, by the network device, a start location, a sending period, and a quantity of repetitions that are used for sending the system message; and for each system message in the at least one system message, sending, by the network device, the system message according to the determined start location, sending period, and quantity of repetitions that are used for sending the system message, where in a time interval between two times of sending a system message, one or more other system messages are sent.

According to a twentieth aspect, this application provides a wireless communications system, including:

a network device, configured to: for each system message in at least one to-be-sent system message, determine a start location, a sending period, and a quantity of repetitions that are used for sending the system message, and send the system message according to the determined start location, sending period, and quantity of repetitions that are used for sending the system message; and a terminal device, configured to: for each system message in at least one to-be-received system message sent by the network device, determine a start location, a sending period, and a quantity of repetitions that are used for sending the system message by the network device, and receive the system message according to the determined start location, sending period, and quantity of repetitions that are used for sending the system message by the network device, where in a time interval between two times of sending a system message, one or more other system messages are sent by the network device.

In any one of the sixteenth aspect to the twentieth aspect, in a process of repeatedly sending a system message twice, the network device further sends another system message. Therefore, a terminal device with better coverage may receive a next system message without waiting for completion of repeated sending of a system message, and when all system messages that need to be updated are updated, the terminal device may enter a sleep state without receiving a subsequent system message that is repeatedly sent. In this way, system message update efficiency of the terminal with better coverage can be improved, and energy consumption of such a terminal device caused by reception of an unnecessary repeated system message can be reduced.

BRIEF DESCRIPTION OF DRAWINGS

FIG. 10 is a schematic structural diagram of a first type of terminal device according to Embodiment 6 of this application;

FIG. 11 is a schematic structural diagram of a second type of terminal device according to Embodiment 7 of this application;

FIG. 12 is a schematic structural diagram of a first type of network device according to Embodiment 8 of this application;

FIG. 13 is a schematic structural diagram of a second type of network device according to Embodiment 9 of this application;

FIG. 14 is a flowchart of a first system message update method according to Embodiment 10 of this application;

FIG. 22 is a schematic structural diagram of a fifth type of terminal device according to Embodiment 18 of this application;

FIG. 23 is a schematic structural diagram of a sixth type of terminal device according to Embodiment 19 of this application;

FIG. 24 is a schematic structural diagram of a fifth type of network device according to Embodiment 20 of this application;

FIG. 25 is a schematic structural diagram of a sixth type of network device according to Embodiment 21 of this application;

FIG. 26 is a flowchart of a fifth system message update method according to Embodiment 22 of this application;

DESCRIPTION OF EMBODIMENTS

Figure 1:
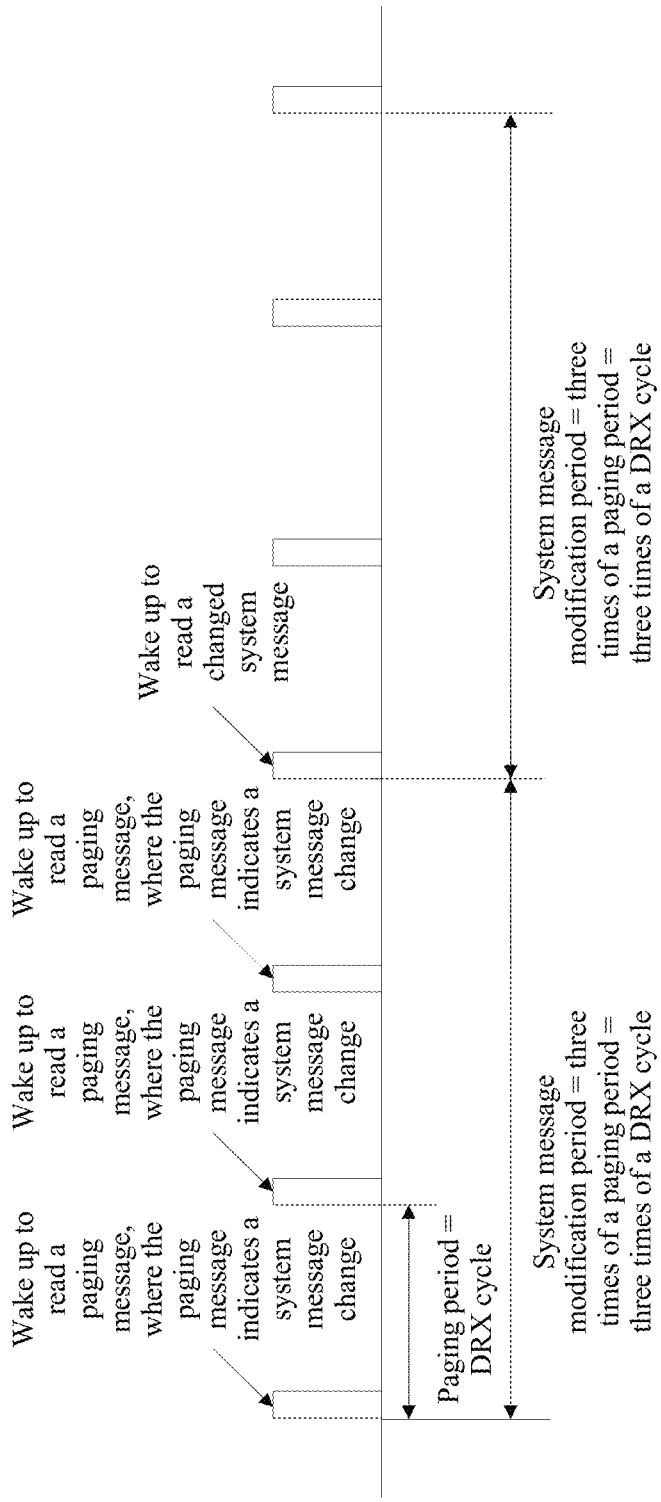
FIG. 1 is a schematic diagram of a process in which a terminal device updates a system message according to a paging message in an LTE system.
Figure 2:
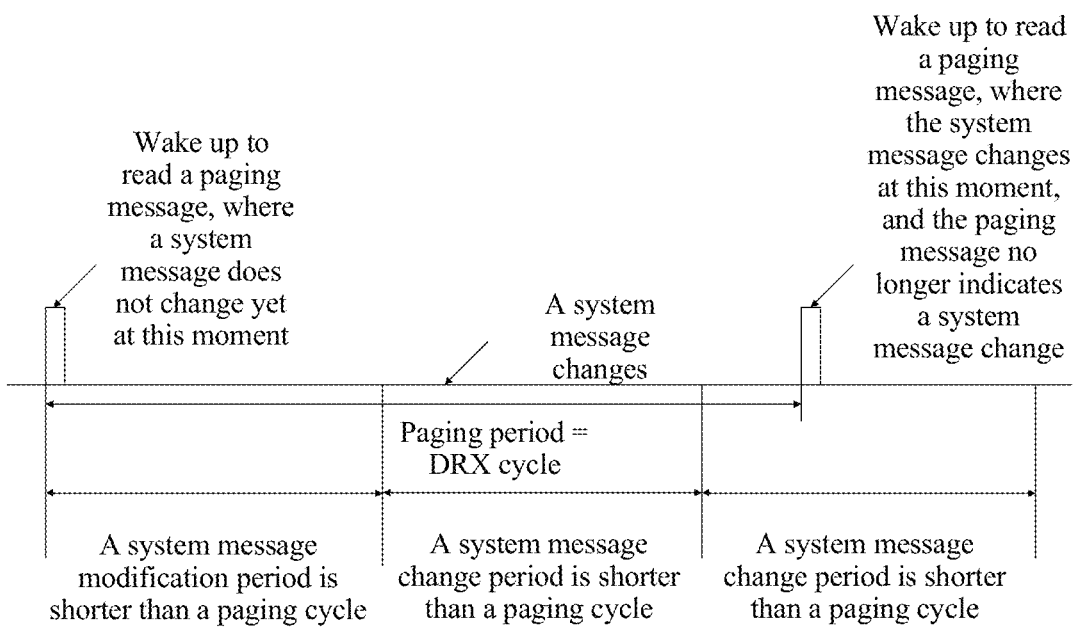
FIG. 2 is a schematic diagram in which a terminal device with long DRX cycle fails to normally update a system message.

To better understand the above objects, solutions, and advantages of this application, detailed description is provided below. The detailed description illustrates various implementations of apparatuses and/or methods by using the accompanying drawings such as block diagrams and flowcharts and/or examples. In these block diagrams, flowcharts, and/or examples, one or more functions and/or operations are included. Persons skilled in the art will appreciate that each function and/or operation in these block diagrams, flowcharts, or examples can be implemented separately or jointly by a variety of hardware, software, and firmware, or implemented by any combination of hardware, software, and firmware.

According to one aspect, this application provides a system message update solution. In this solution, a network device adds indication information to a to-be-sent first system message, and after receiving the first system message, a terminal device updates system messages other than the first system message according to the indication information. The first system message is periodically sent, and occupies a fixed physical resource location.

In this solution, the indication information is sent in the first system message instead of a paging message. The terminal device may update the system messages other than the first system message according to the indication information, thereby updating all system messages. In comparison with a current solution in which a system message change is learned by using a paging message, it is avoided that the terminal device may fail to receive a paging message used for indicating a system message change and further cannot update a system message because a DRX cycle of the terminal device is longer than a system message modification period.

According to another aspect, this application provides another system message update solution. In this solution, system messages sent by a network device include a first system message, a second system message, and at least one third system message. The first system message is periodically sent, and occupies a fixed physical resource location; the second system message includes scheduling information of the at least one third system message; and the at least one third system message includes a paging-related system message. When sending the first system message, the network device adds indication information to the first system message, and the indication information is used to indicate whether the paging-related system message in the third system message is updated. If the indication information indicates that the paging-related system message is not updated, a terminal device receives a paging message according to a recorded paging-related system message, and updates a system message according to indication information related to a system message update in the received paging message.

In this solution, the first system message periodically sent by the network device indicates whether the paging-related system message is updated. If the paging-related system message is not updated, the terminal device may still normally receive the paging message according to the recorded paging-related system message, so as to further obtain the indication information related to a system message update from the paging message, and update a system message according to the indication information obtained from the paging message. In this way, even if a DRX cycle is longer than a system message update period, because it is learned that the system message related to the paging message is not updated, the terminal device can still correctly receive the paging message according to the recorded paging-related system message, so as to successfully obtain the indication information related to a system message update from the paging message, and successfully update a system message.

According to still another aspect, this application provides still another system message update solution. This solution is applied to a scenario in which a paging message can be normally received. For example, a system message update period is an integer multiple of a DRX cycle. In this solution, when a network device sends a paging message, for a first system message, a second system message, and at least one third system message, system message update indication information carried in the paging message indicates whether a first terminal device needs to update the system message; and the terminal device updates a system message according to the system message update indication information. The first system message is periodically sent, and occupies a fixed physical resource location; and the second system message includes scheduling information of the at least one third system message.

In this solution, indication information for each system message is carried in a paging message, and the indication information is used to indicate whether the corresponding system message needs to be updated. The terminal device may determine, according to a specific status of each piece of indication information, how to update a system message. For example, if indication information of a second system message indicates that the second system message does not need to be updated, when updating at least one third system message, a terminal device performs an update only according to a recorded second system message without reading the second system message again, thereby improving system message update efficiency of the terminal device.

According to yet another aspect, this application provides a system message sending solution. When sending a system message, a network device sends one or more other system messages in an entire time interval between two times of sending a system message.

Currently, each system message can be sent in only one SI window (SI-window), and may be sent in the system message window multiple times. An SI window of a system message is adjacent to an SI window of another system message. However, only one system message can be sent in one SI window. After receiving a system message in an SI window, a terminal device needs to wait for a next SI window to receive a next system message. In the solution provided in this application, the network device further sends another system message in a process of repeatedly sending a system message twice. In this case, after receiving a system message, the terminal device may receive another system message without waiting a system message window, thereby improving system message update efficiency.

For ease of understanding, the following describes basic concepts included in this application.

1. CIoT

Cellular Internet of things (CIoT) is Internet of things implemented based on a cellular network.

In order to cope with an explosive mobile data traffic growth, massive device connections, continuous emergence of various new services and application scenarios in future, the fifth generation (5G) mobile communications system emerges. As a part of the 5G system, Internet of things has a rapidly increasing market requirement. A forecast shows that by the year 2022, a connection quantity will reach 18 billion in Internet of things implemented based on the 5G system.

Currently, the 3rd Generation Partnership Project (3GPP) is working on Internet of things based on a cellular network, and designing a new air interface (also referred to as "wireless interface") technology to carry a service of Internet of things.

A system message transmission solution provided in this application may be applied to IoT, or may be applied to CIoT, so as to resolve a problem in Internet of things that when a DRX cycle of a terminal device is longer than a system message modification period, the terminal device may fail to normally update a system message. However, it does not mean that the system message transmission solution can be applied only to IoT. Actually, the terminal device may fail to normally update a system message provided that the DRX cycle of the terminal device is longer than the system message modification period. The solution provided in this application is used to resolve the problem that the terminal device cannot normally update a system message because the DRX cycle of the terminal device is longer than the system message modification period. A system or a network to which the solution is applied is not limited.

2. System Information

System information is a message sent by a network device such as a base station to a terminal device in a cell in a wireless communications system. The message includes cell-level information of the cell, and the cell-level information is valid for all terminal devices that access the cell. Generally, the network device sends the system information in a broadcast manner.

The system information may be further divided according to content, importance, and the like of the system information. The following describes composition of system information by using a system message in a current LTE system as an example. Although division manners are slightly different between the current LTE system and another system, principles are basically the same, and details are not described herein.

In the LTE system, system information may be divided into a master information block (MIB) and multiple system information blocks (SIB), and the SIBs include an SIB1 and another SIB. Each piece of system information includes a set of a series of parameters related to a function.

In the LTE system, there are three types of RRC messages used to transmit system information, and the three types of RRC messages are respectively:

(1) an MIB message, used to transmit the MIB;

(2) an SIB1 message, used to transmit the SIB1; and (3) one or more SI messages, used to transmit an SIB other than the SIB1.

The MIB message is transmitted on a physical broadcast channel (PBCH), and a time-frequency resource is fixed. If the SIB1 exists, a frequency domain resource used for transmitting the SIB1 message is scheduled by using physical downlink control channel (PDCCH) signaling, and a time domain resource used for transmitting the SIB1 message is fixed.

Different from a fixed time-frequency location of the MIB message, both the SIB1 message and the SI message are transmitted on a physical downlink shared channel (PDSCH), and resource blocks (RB) (frequency-domain locations) occupied by the SIB1 message and the SI message, transmission formats of the SIB1 message and the SI message, and the like are dynamically scheduled, and are indicated by using PDCCH signaling. UE performs blind detection on a PDCCH in a subframe to determine whether the SI message exists in the subframe (a time-domain location of the SIB1 is fixed).

An evolved NodeB (eNB) may flexibly change occupied bandwidth, used RB sets, transmission formats, and the like of the SIB1 message and the SI message according to a specific case. Each SI message includes one or more SIBs other than the SIB1, and these SIBs have a same scheduling requirement (for example, a same transmission period).

The SIB1 message specifies an SIB included in an SI message, and a period, scheduling information, and the like of the SI message.

In this application, system messages are classified as follows:

(1) First system message: The first system message is periodically sent on a physical broadcast channel (for example, a PBCH in the LTE system), and occupies a fixed physical resource location (for example, an occupied time-domain resource location and an occupied frequency-domain resource location are fixed in the LTE system). Generally, a sending period of the first system message is shorter than a system message update period.

For the LTE system, the first system message may be an MIB message, and a sending period is 40 ms.

(2) Second system message: The second system message is sent on a service channel (for example, a PDSCH in the LTE system), and occupies an unfixed physical resource location (or only a time-domain location is fixed, and a frequency-domain location is indicated by using scheduling signaling), and the second system message includes scheduling information of at least one third system message. The second system message may be periodically sent. If the second system message is periodically sent, a sending period of the second system message is usually shorter than the system message update period, and is longer than the sending period of the first system message.

For the LTE system, the second system message may be an SIB1 message, and is used to transmit an SIB1. The SIB1 message is periodically sent, and a sending period is 80 ms.

(3) At least one third system message: The at least one third system message is sent on a service channel (for example, a PDSCH in the LTE system), and occupies an unfixed physical resource location.

For example, for the LTE system, the third system message is an SI message.

In Embodiment 1, system messages include at least two third system messages, and the at least two system messages include at least one normal third system message and at least one activation-related third system message.

The activation-related third system message is a system message that needs be obtained by a terminal device in a cell when a particular function of the cell is activated, and the normal third system message is a system message in the at least two system messages other than the activation-related third system message.

In an example of the LTE system, SI messages that are in all SI messages and that are used to transmit an SIB10, an SIB11, an SIB12, and an SIB14 may be activation-related third system messages, and another system message in the SI messages is a normal third system message.

Optionally, one normal third system message may be used to transmit at least one piece of system information, and when one or more pieces of system information change, it is considered that the normal third system message for transmitting the system information needs to be updated. One activation-related third system message may also be used to transmit at least one piece of system information, and when one or more pieces of system information change, it is considered that the activation-related third system message for transmitting the system information needs to be updated. In this case, a relationship between a third system message and system information may be referred to as a one-to-many relationship.

Alternatively, optionally, one normal third system message may be used to transmit at least one piece of system information, and when one or more pieces of system information change, it is considered that the normal third system message for transmitting the system information needs to be updated. One activation-related third system message may be used to transmit only one piece of system information, and when the system information changes, it is considered that the activation-related third system message for transmitting the system information needs to be updated. In this case, a correspondence between a normal third system message and system information may be referred to as a one-to-many relationship, and a correspondence between an activation-related third system message and system information may be referred to as a one-to-one relationship.

Still alternatively, optionally, one normal third system message may be used to transmit only one piece of system information, and when the system information changes, it is considered that the normal third system message for transmitting the system information needs to be updated. One activation-related third system message may be used to transmit at least one piece of system information, and when one or more pieces of system information change, it is considered that the activation-related third system message for transmitting the system information needs to be updated. In this case, a correspondence between a normal third system message and system information may be referred to as a one-to-one relationship, and a correspondence between an activation-related third system message and system information may be referred to as a one-to-many relationship.

Still alternatively, optionally, one normal third system message may be used to transmit only one piece of system information, and when the system information changes, it is considered that the normal third system message for transmitting the system information needs to be updated. One activation-related third system message may be used to transmit only one piece of system information, and when the system information changes, it is considered that the activation-related third system message for transmitting the system information needs to be updated. In this case, a correspondence between a third system message and system information may be referred to as a one-to-one relationship.

In the current LTE system, when reading a paging message to learn that system information needs to be updated, a terminal device needs to read all system messages. However, in this application, for different system messages, whether the system messages need to be updated is indicated, so that the terminal device does not need to read a system message that does not need to be updated, thereby reducing energy consumption and alleviating processing load. Particularly, when a system message is in a one-to-one relationship with system information, a system information change may be learned for each piece of system information. The terminal device needs to read a corresponding system message only when one piece of system information changes. In comparison with a one-to-many relationship between a system message and system information, division is more refined, thereby further reducing energy consumption and processing load of the terminal device. However, more information bits are required when a network device notifies a system information change, thereby increasing information control overheads.

For the first system message and the second system message, because a system message includes only one piece of system information, it may be considered that the system message is in a one-to-one correspondence with the system information.

Therefore, in this application, for ease of understanding, when a system message is in a one-to-one correspondence with system information, it is considered that if the system information changes, the corresponding system message needs to be updated, or when a system message is in a one-to-many correspondence with system information, it is considered that if any one or more pieces of system information change, the corresponding system message needs to be updated. In the following description, a system information update is not clearly differentiated from a system message update.

3. Current Solution to System Message Change Notification in an LTE System

In the current LTE system, a terminal device is notified of an upcoming system message change in a paging manner and by using ValueTag, and the paging manner is a main manner. When a cell is to modify some system information, a base station first sets systemInfoModification fields in all paging messages in a current system message modification period to 1, to indicate that a system message is to change (but does not send updated content), and then the cell sends updated system information in a next subsequent system message modification period. By receiving a paging message and detecting a systemInfoModification field, the terminal may learn in advance that a system message is to change, and then receive all system messages again when the next system message modification period starts.

For a terminal in an idle state, to reduce energy consumption of the terminal, the terminal is in a sleep state in most of the time. However, the terminal wakes up at an interval (DRX cycle) to receive a paging message periodically sent by a system, and then enters a sleep state again. The DRX cycle is equal to a paging period. In the LTE system, a system message modification period is an integer multiple of the paging period. That is, before system information changes, the terminal has multiple chances to receive the paging message and read a systemInfoModification field from the paging message, so as to obtain information indicating whether the system information changes. If systemInfoModification=1, the terminal reads the system information in the following sequence when a next system message modification period starts.

(1) Read an MIB.

(2) Monitor a physical downlink control channel (PDCCH), obtain frequency-domain scheduling information of an SIB1 according to PDCCH information scrambled by using a system message-radio network temporary identity (SI-RNTI), determine a time-frequency location of the SIB1 according to fixed time-domain scheduling information, and read the SIB1.

(3) Determine a resource location of each system message according to information such as a period and scheduling information of each piece of SI and a mapping relationship between SI and another SIB that are included in the SIB1.

(4) Read all SI messages.

For a terminal in an idle state, a system message modification period is an integer multiple of a paging period. That is, in a system message modification period, the terminal has multiple chances to receive a paging message. Therefore, it is reliable that a system message change is indicated by using a paging message in the current LTE system.

However, as described above, if a long DRX cycle is used, for example, if a long DRX cycle is used in CIoT, a paging period may be longer than a system message modification period. When a terminal wakes up and is to receive a paging message, system information (especially paging-related system information) may have changed. In this case, it cannot be ensured that the terminal can successfully receive a system message.

Therefore, in a long DRX cycle system such as CIoT, a current manner in which a system message change is notified in a paging manner is not reliable.

In addition, SIBs do not simultaneously change in each modification period, and only some SIBs may change. A separate systemInfoModification indication can indicate only whether there is a change, but cannot indicate a specific change. Therefore, the terminal needs to receive all system messages again in the current LTE system, and this is electricity-wasting.

4. SI Window (SI-Window) and Scheduling of an SI Message

In the current LTE system, each SI message is transmitted in only one SI window.

(1) One SI message is associated with one SI window, and only the SI message can be sent in the SI window and may be repeatedly sent multiple times (a quantity of sending times, a specific subframe for sending, and the like depend on implementation of a base station), but another SI message cannot be sent.

(2) SI windows are next to each other (if the SI windows are adjacent), and there is no overlap or spacing between the SI windows.

(3) SI window lengths of all SI messages are the same.

(4) Periods of different SI messages are independent of each other.

In the current LTE system, time-domain scheduling of an MIB and an SIB1 are fixed, and a time-domain scheduling process of an SI message is as follows:

(1) A terminal determines a start location of an SI window corresponding to each SI message and a length of the SI window.

The length of the SI window is specified by an SI-WindowLength field of the SIB1, and is in a unit of ms.

A schedulingInfoList field of the SIB1 specifies an SI message list, and a sequence number of each SI message in the list is represented by n (starting from 1).

In this case, for each SI message, $x=(n-1)*w$, where w is SI-WindowLength. It may be learned that x is in a unit of ms.

A start frame of the SI window meets SFN % T=FLOOR (x/10), where T is a period of a corresponding SI message and is specified by SI-periodicity (in a unit of system frame, that is, in a unit of 10 ms). According to an operation of SFN % T, it is ensured that different SI windows are next to each other, and FLOOR(x/10) determines a start system frame of the SI window in the period (a system frame is 10 ms, and therefore there are x/10 system frames), where % represents a mod operation, FLOOR represents returning a maximum integer less than or equal to an expression, and / represents a division operation.

A start subframe of the SI window is # a, where a=x % 10.

It may be learned from the foregoing formula that x determines the start frame and the start subframe of the SI window in the SI period; SFN % T ensures that the SI window appears only once in the SI period; and $x=(n-1)*w$ ensures that SI windows are next to each other (if the SI windows are adjacent), and there is no overlap or spacing between the SI windows.

After the SI window is determined, the base station determines a quantity of times of scheduling same SI in the SI window, and implementations may be different for different manufacturers. However, some subframes cannot be used to schedule an SI message, and these subframes include:

(1) a subframe 5 in a system frame of SFN % 2=0, where the subframe is used to transmit the SIB1;

(2) any multicast-broadcast single-frequency network (MBSFN) subframe; and (3) an uplink subframe in a time division duplex (TDD) LTE system.

5. Other Description

Terms "system" and "network" in the embodiments of the present application may be used interchangeably in this specification. The term "and/or" in this specification describes only an association relationship for describing associated objects and represents that three relationships may exist. For example, A and/or B may represent the following three cases: Only A exists, both A and B exists, and only B exists. In addition, the character "/" in this specification generally indicates an "or" relationship between the associated objects.

The basic concepts included in this application are described above. For ease of understanding, main content and the included accompanying drawings in the embodiments of this application are shown in Table 1 below.

The network device 301 sends a system message in a cell, and the at least one terminal device 302 receives the system message sent by the network device 301.

A communications standard of the wireless communications system provided in Embodiment 1 includes but is not limited to Global System for Mobile Communications (GSM), Code Division Multiple Access (CDMA) IS-95, Code Division Multiple Access (CDMA) 2000, Time Division-Synchronous Code Division Multiple Access (TD-SCDMA), Wideband Code Division Multiple Access (WCDMA), Time Division Duplex-Long Term Evolution (TDD LTE), Frequency Division Duplex-Long Term Evolution (FDD LTE), Long Term Evolution-Advanced (LTE-advanced), a personal handyphone system (PHS), Wireless Fidelity (WiFi) specified in the 802.11 series protocols, Worldwide Interoperability for Microwave Access (Wi-MAX), and various evolved wireless communications systems in future.

The terminal device 302 may be a wireless terminal. The wireless terminal may refer to a device that provides voice and/or data connectivity for a user, a handheld device with a wireless connection function, or another processing device connected to a wireless modem. The wireless terminal may communicate with one or more core networks by using a radio access network (such as RAN). The wireless terminal

TABLE 1

Figure 3:
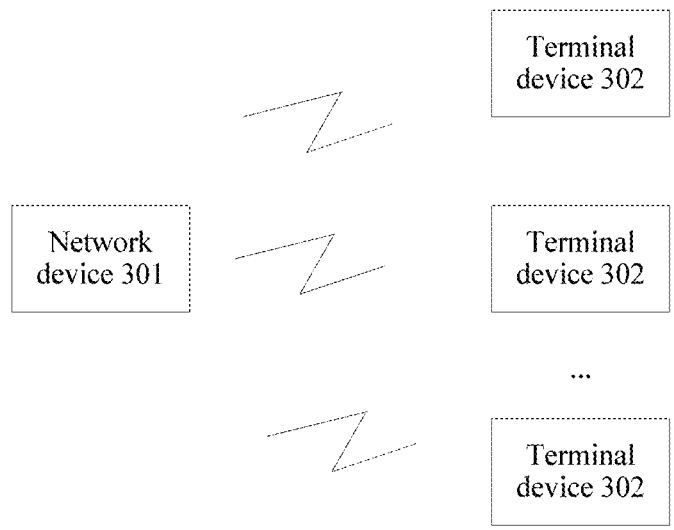
FIG. 3 is a schematic structural diagram of a wireless communications system according to Embodiment 1 of this application.
Figure 4:
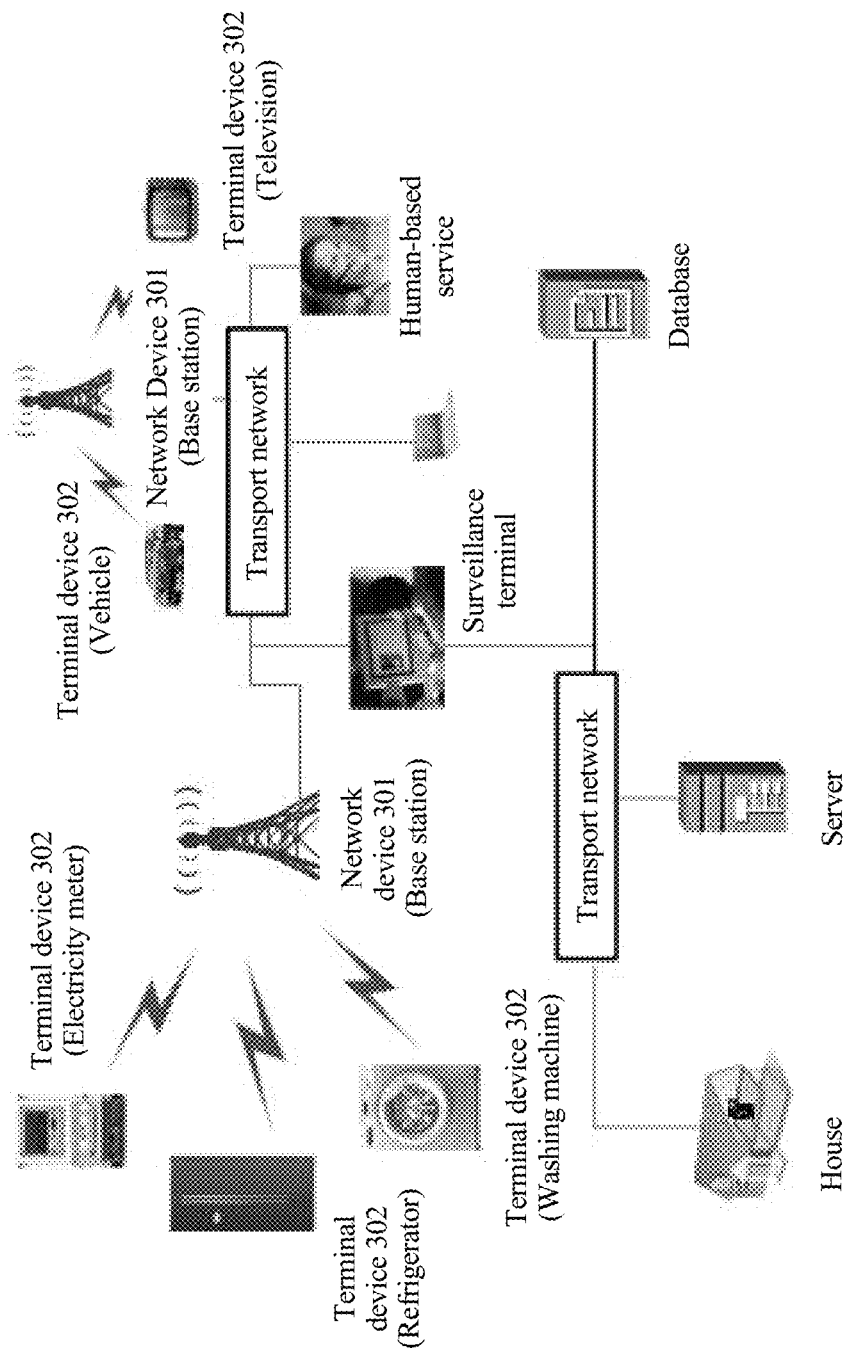
FIG. 4 is a schematic structural diagram of an applicable CIoT system in a wireless communications system according to Embodiment 1 of this application.
Figure 5:
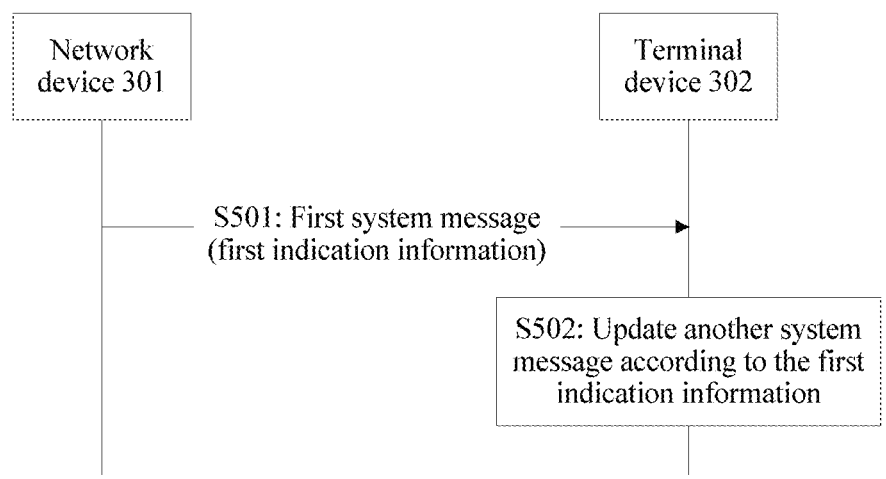
FIG. 5 is a flowchart of a first system message update solution according to Embodiment 2 of this application.
Figure 6A:
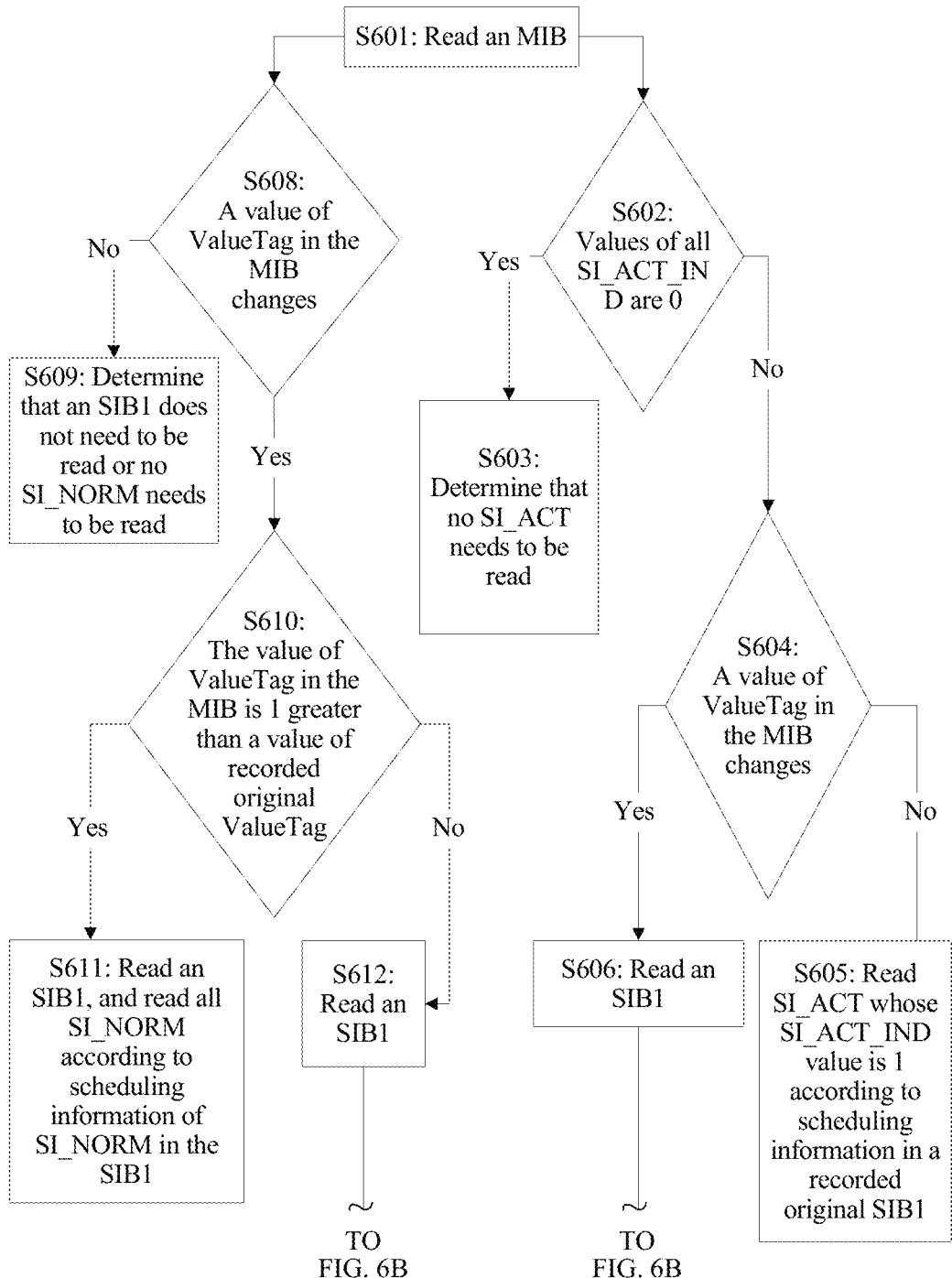
FIG. 6A and FIG. 6B are a flowchart of an optional solution 3 according to Embodiment 2 of this application.
Figure 6B:
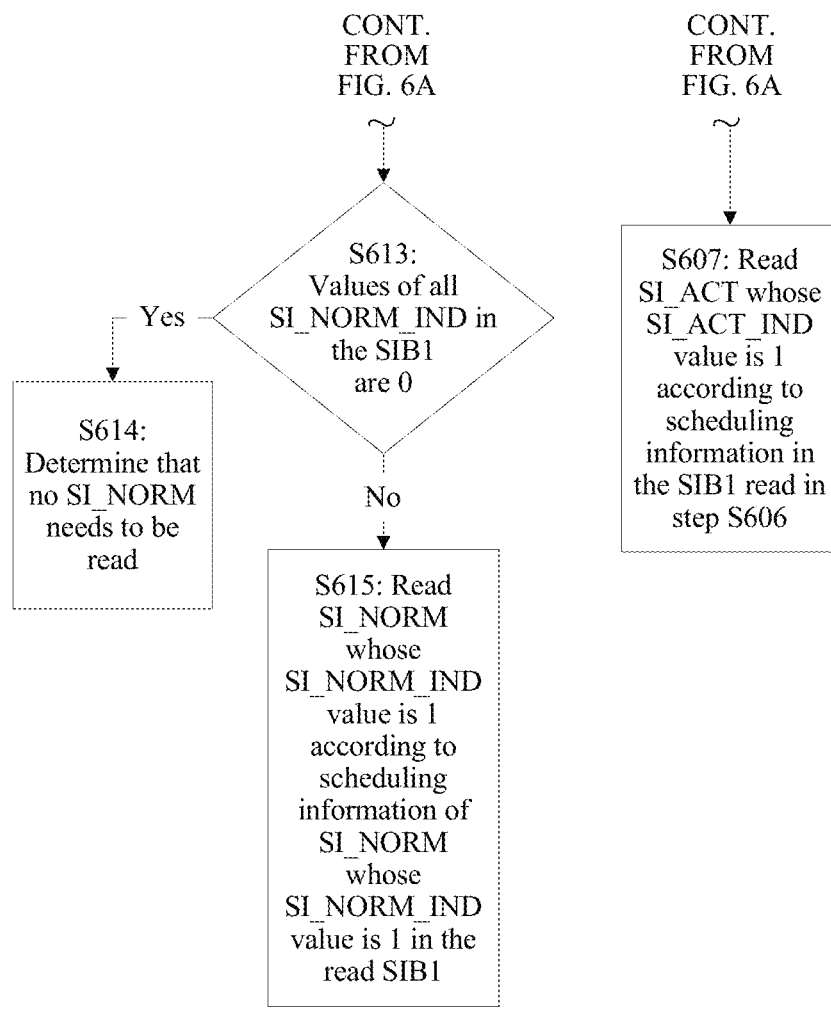
Figure 7:
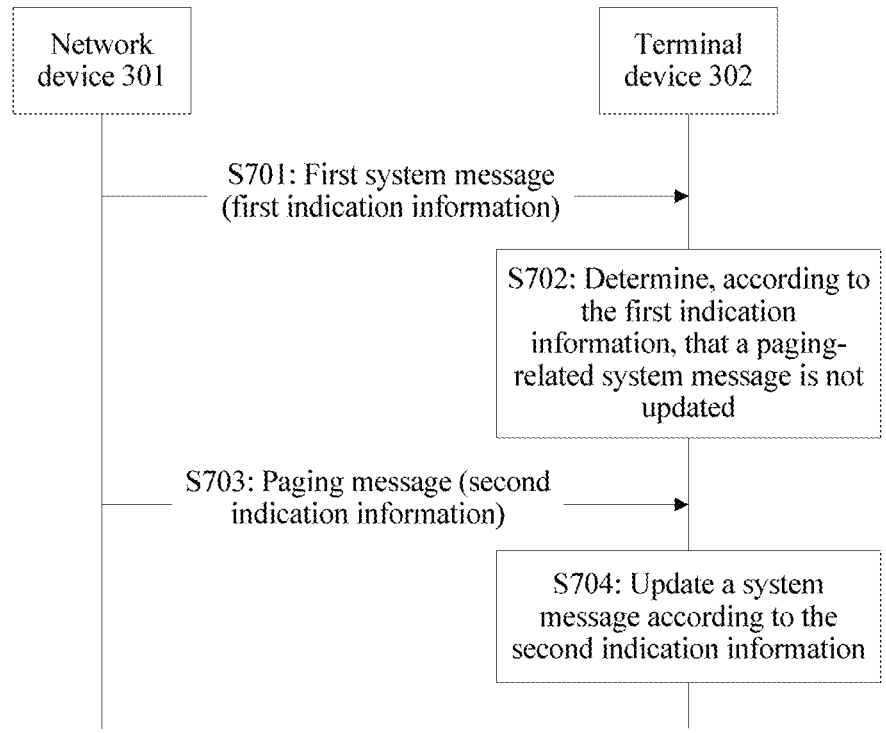
FIG. 7 is a flowchart of a second system message update solution according to Embodiment 3 of this application.
Figure 8:
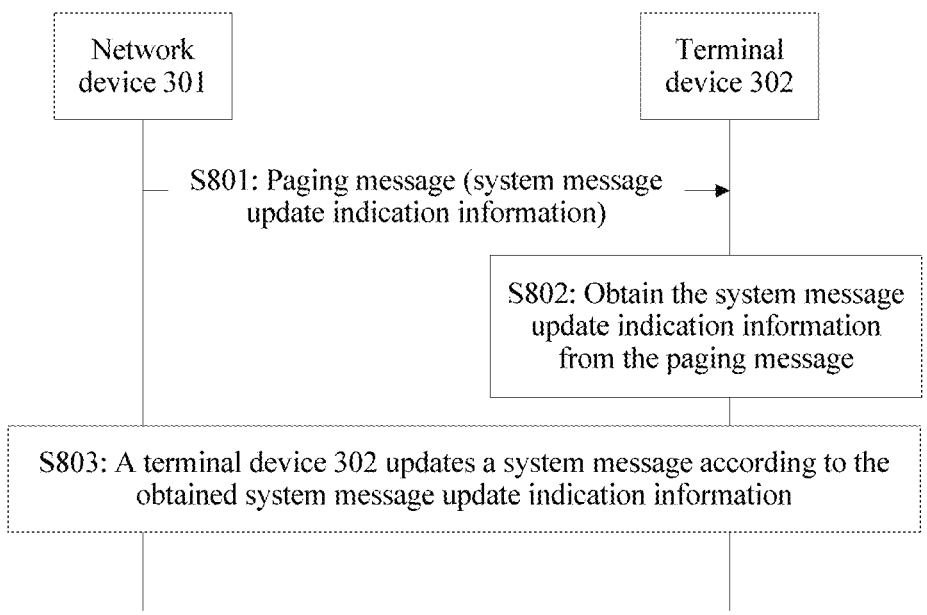
FIG. 8 is a flowchart of a third system message update solution according to Embodiment 4 of this application.
Figure 9A:
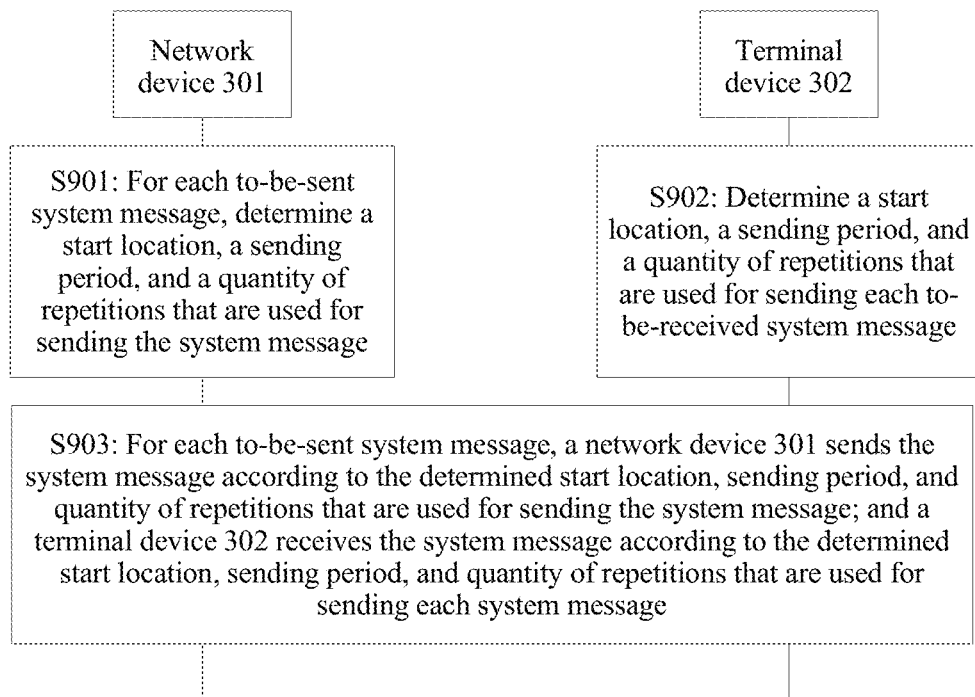
FIG. 9A is a flowchart of a system message transmission solution according to Embodiment 5 of this application.
Figure 9B:
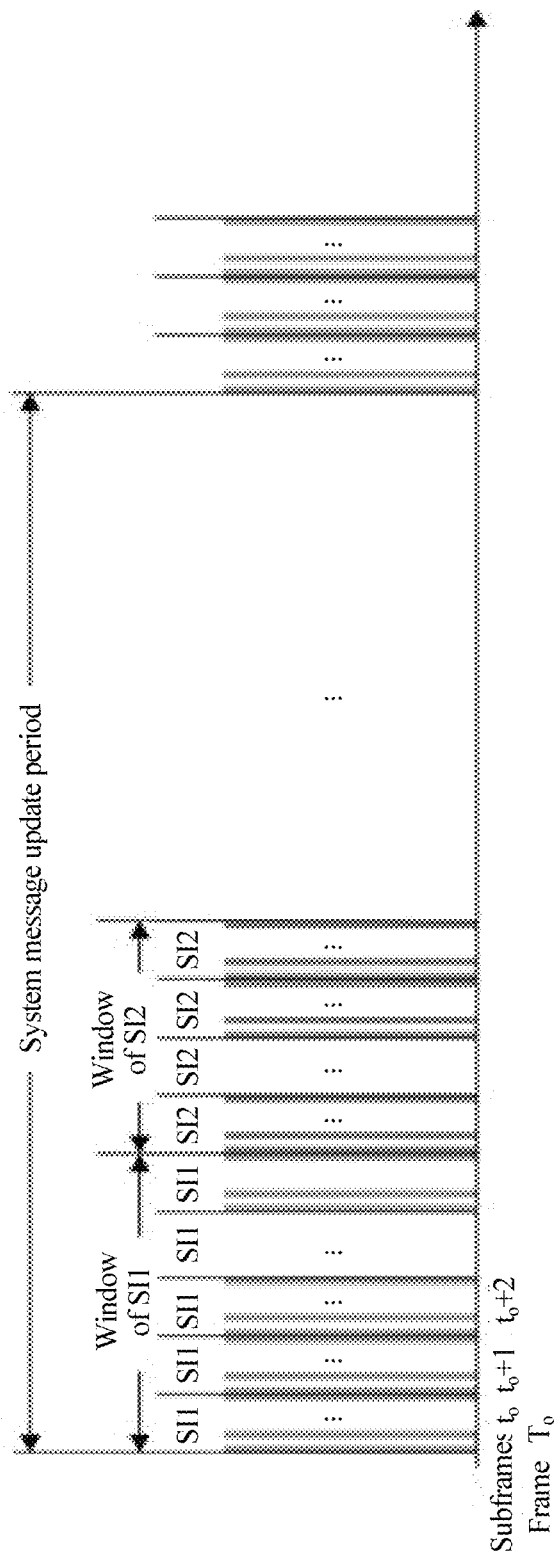
FIG. 9B is a schematic diagram of a system message transmission manner according to Embodiment 5 of this application.
Figure 9C:
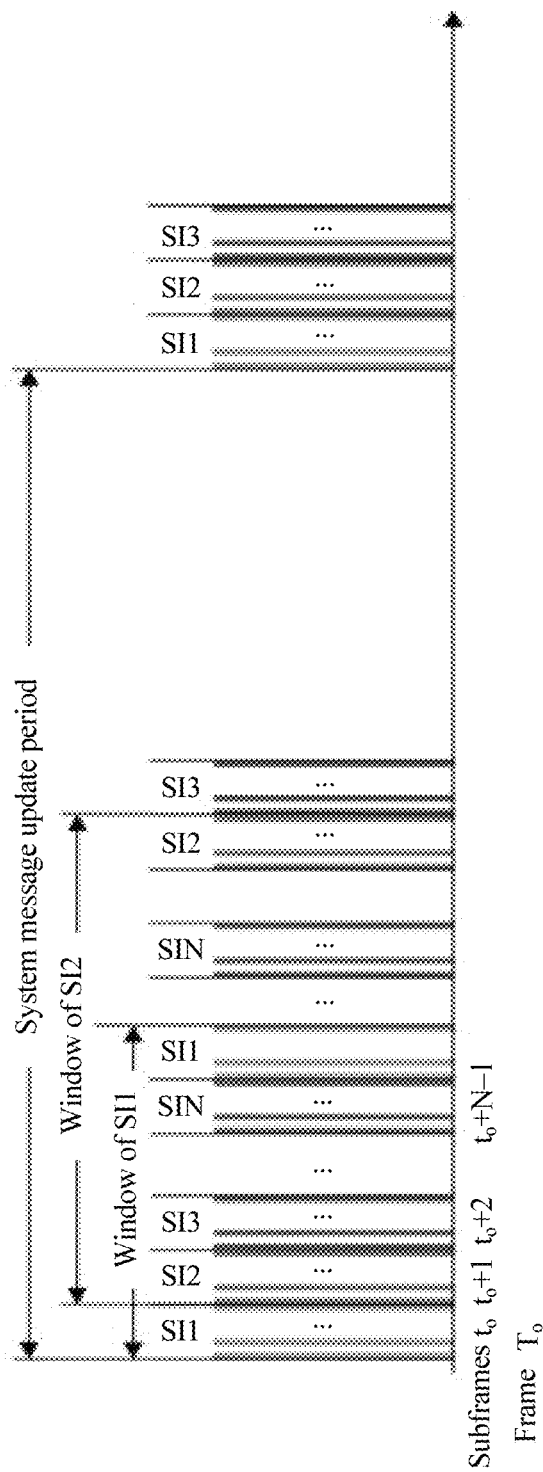
FIG. 9C is a schematic diagram of another system message transmission manner according to Embodiment 5 of this application.
Figure 15:
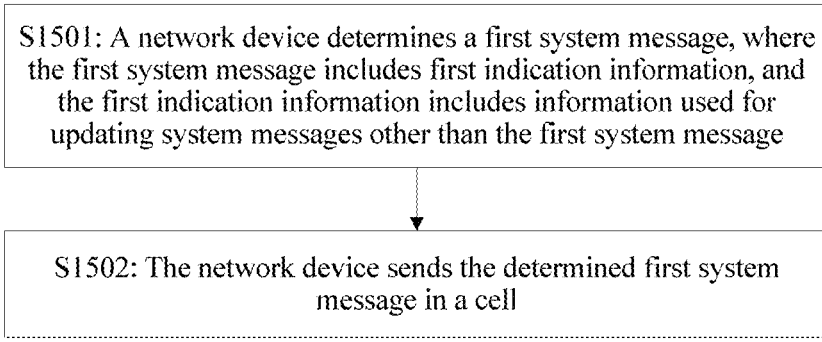
FIG. 15 is a flowchart of a second system message update method according to Embodiment 11 of this application.
Figure 16:
FIG. 16 is a schematic structural diagram of a third type of terminal device according to Embodiment 12 of this application.
Figure 17:
FIG. 17 is a schematic structural diagram of a fourth type of terminal device according to Embodiment 13 of this application.
Figure 18:
FIG. 18 is a schematic structural diagram of a third type of network device according to Embodiment 14 of this application.
Figure 19:
FIG. 19 is a schematic structural diagram of a fourth type of network device according to Embodiment 15 of this application.
Figure 20:
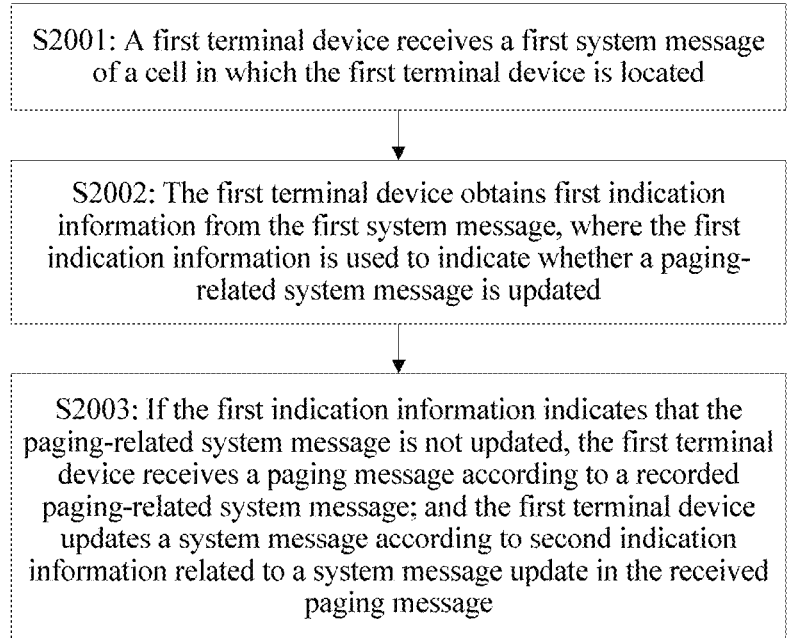
FIG. 20 is a flowchart of a third system message update method according to Embodiment 16 of this application.
Figure 21:
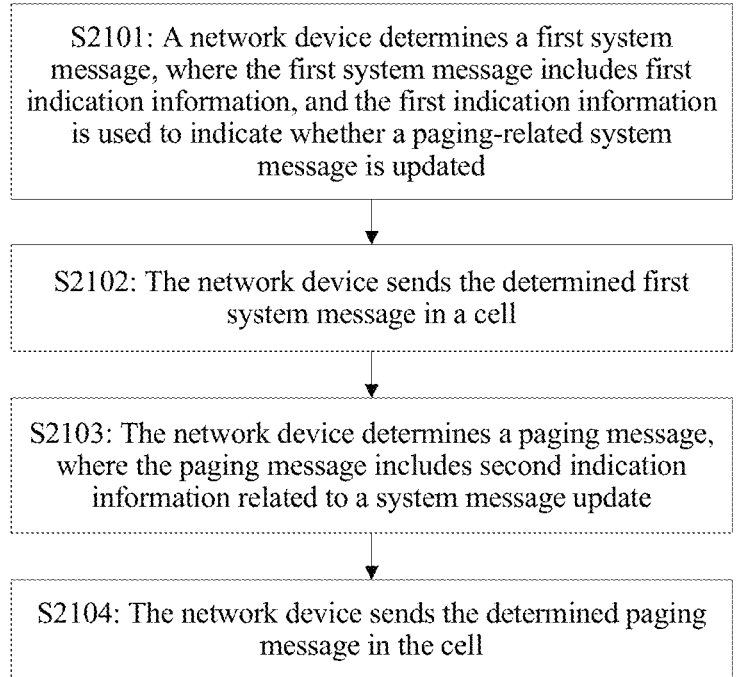
FIG. 21 is a flowchart of a fourth system message update method according to Embodiment 17 of this application.
Figure 27:
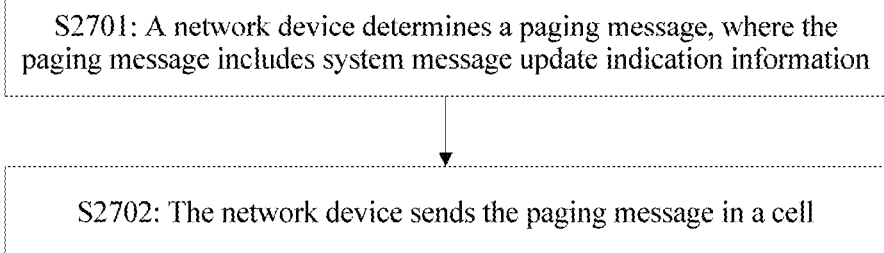
FIG. 27 is a flowchart of a sixth system message update method according to Embodiment 23 of this application.
Figure 28:
FIG. 28 is a schematic structural diagram of a seventh type of terminal device according to Embodiment 24 of this application.
Figure 29:
FIG. 29 is a schematic structural diagram of an eighth type of terminal device according to Embodiment 25 of this application.
Figure 30:
FIG. 30 is a schematic structural diagram of a seventh type of network device according to Embodiment 26 of this application.
Figure 31:
FIG. 31 is a schematic structural diagram of an eighth type of network device according to Embodiment 27 of this application.
Figure 32:
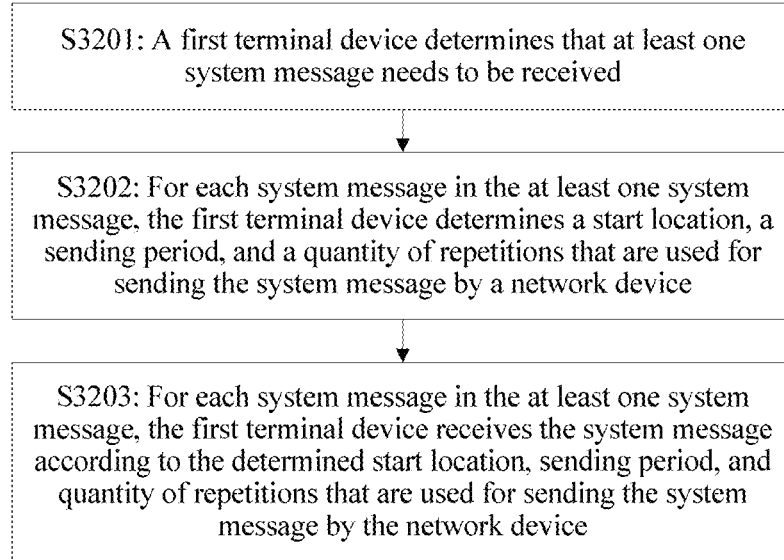
FIG. 32 is a flowchart of a seventh system message transmission method according to Embodiment 28 of this application.
Figure 33:
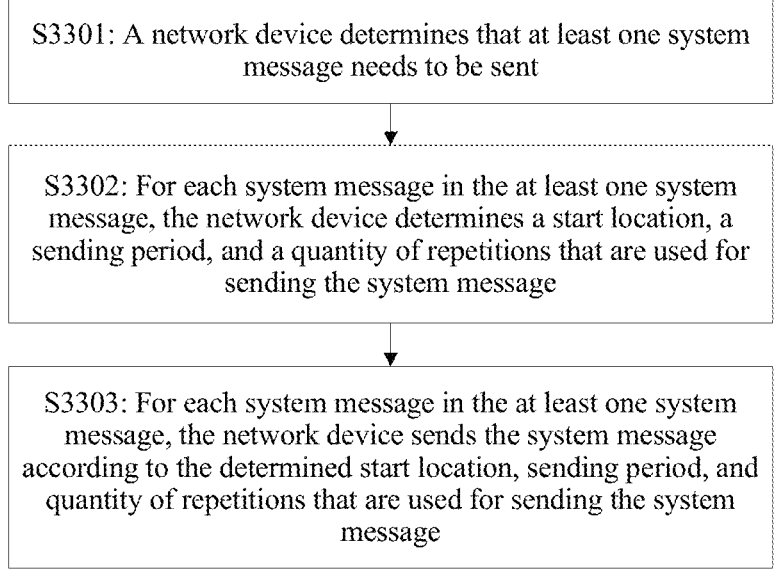
FIG. 33 is a flowchart of an eighth system message transmission method according to Embodiment 29 of this application.

| Embodiments | Main content | Accompanying drawings |
|---|---|---|
| Embodiment 1 | Wireless communications system | FIG. 3 and FIG. 4 |
| Embodiment 2 | First system message update solution | FIG. 5, FIG. 6A, and FIG. 6B |
| Embodiment 3 | Second system message update solution | FIG. 7 |
| Embodiment 4 | Third system message update solution | FIG. 8 |
| Embodiment 5 | System message transmission solution | FIG. 9A to FIG. 9C |
| Embodiment 6 | First type of terminal device | FIG. 10 |
| Embodiment 7 | Second type of terminal device | FIG. 11 |
| Embodiment 8 | First type of network device | FIG. 12 |
| Embodiment 9 | Second type of network device | FIG. 13 |
| Embodiment 10 | First system message update method | FIG. 14 |
| Embodiment 11 | Second system message update method | FIG. 15 |
| Embodiment 12 | Third type of terminal device | FIG. 16 |
| Embodiment 13 | Fourth type of terminal device | FIG. 17 |
| Embodiment 14 | Third type of network device | FIG. 18 |
| Embodiment 15 | Fourth type of network device | FIG. 19 |
| Embodiment 16 | Third system message update method | FIG. 20 |
| Embodiment 17 | Fourth system message update method | FIG. 21 |
| Embodiment 18 | Fifth type of terminal device | FIG. 22 |
| Embodiment 19 | Sixth type of terminal device | FIG. 23 |
| Embodiment 20 | Fifth type of network device | FIG. 24 |
| Embodiment 21 | Sixth type of network device | FIG. 25 |
| Embodiment 22 | Fifth system message update method | FIG. 26 |
| Embodiment 23 | Sixth system message update method | FIG. 27 |
| Embodiment 24 | Seventh type of terminal device | FIG. 28 |
| Embodiment 25 | Eighth type of terminal device | FIG. 29 |
| Embodiment 26 | Seventh type of network device | FIG. 30 |
| Embodiment 27 | Eighth type of network device | FIG. 31 |
| Embodiment 28 | Seventh system message transmission method | FIG. 32 |
| Embodiment 29 | Eighth system message transmission method | FIG. 33 |

Embodiment 1

FIG. 3 shows a wireless communications system according to this application, and an architecture of the wireless communications system is applicable to all embodiments of this application.

As shown in FIG. 3, the wireless communications system includes a network device 301 and at least one terminal device 302.

may be a mobile terminal, such as a mobile phone (or referred to as a "cellular" phone) and a computer with a mobile terminal. For example, the wireless terminal may be a portable, pocket-sized, handheld, computer built-in, or in-vehicle mobile apparatus, which exchanges voice and/or data with the radio access network. For example, the wireless terminal may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a subscriber unit, a subscriber station, a mobile station, a mobile terminal (Mobile), a remote station, an access point, a remote terminal, an access terminal, a user terminal, a user agent, a user device, or user equipment.

The network device 301 may include a base station, or a radio resource management device for controlling a base station, or may include a base station and a radio resource management for controlling the base station. The base station may be a macro base station or a small-cell base station, such as a small cell or a pico cell. The base station may be a home base station, such as a home NodeB (HNB) or a home evolved NodeB (HeNB). The base station may include a relay node (relay) and the like.

For example, for an LTE system such as TDD LTE, FDD LTE, or LTE-A, the network device 301 in the wireless communications system provided in this embodiment of the present application may be an evolved NodeB (eNodeB), and the terminal device 302 may be UE. For a TD-SCDMA system or a WCDMA system, the network device 301 in the wireless communications system provided in this embodiment of the present application may include a NodeB and/or a radio network controller (RNC), and the terminal device 302 may be UE. For a GSM system, the network device 301 provided in this embodiment of the present application may include a base transceiver station (BTS) and/or a base station controller (BSC), and the terminal device 302 is a mobile station (MS). For a WiFi system, the network device 301 may include an access point (AP) and/or an access controller (AC), and the terminal device 302 may be a station (STA).

A specific example of the wireless communications system provided in Embodiment 1 may be a CIoT system. The CIoT system is widely applied to multiple fields, such as an intelligent transportation system, a building control system, a household intelligent control system, a video surveillance system, and industrial monitoring. As shown in FIG. 4, a refrigerator, an electricity meter, a car, or the like can be used as the terminal device 302 in the CIoT system, and communicate with another terminal device by using a base station, a transmission network, or the like, for example, an electricity meter communicates with a car.

Embodiment 2

As shown in FIG. 5, a system message update procedure provided in Embodiment 2 includes the following steps:

S501: A network device 301 sends a first system message in a cell, where the first system message carries first indication information, and the first indication information is related to a system message update.

S502: After receiving the first system message, a terminal device 302 obtains the first indication information from the first system message, and updates system messages other than the first system message according to the first indication information.

The first system message is periodically sent, and occupies a fixed physical resource location. The terminal device 302 may be in an idle state, and learns a sending period, a sending moment, and a physical resource location that are of the first system message in advance. The terminal device 302 may read the first system message in each DRX cycle when the terminal device 302 wakes up. Optionally, after the terminal device 302 wakes up, the terminal device 302 may read the first system message before reading a paging message.

The sending period of the first system message may be set according to product implementation, for example, to 40 ms.

Optionally, if the first indication information indicates that the system messages other than the first system message need to be updated, the terminal device 302 determines that a system message needs to be updated, and updates the system message. If the first indication information indicates that the system messages other than the first system message do not need to be updated, the terminal device 302 determines that a system message does not need to be updated. In this way, it can be determined, by reading the first indication information from the first system message without reading the other system messages, whether the system messages other than the first system message need to be read, thereby saving electricity and alleviating processing load.

The following describes several optional implementation solutions of the first indication information with examples.

Optional Solution 1

The first indication information may indicate, by using ValueTag, whether all system messages need to be updated. For example, a value range of ValueTag is 0-31, and a value of ValueTag increases by 1 each time a system message is updated. Herein, each time a system message is updated means that in a system message update period, a system message is updated once provided that some of the system messages other than the first system message are updated. The value of ValueTag increases only by 1 regardless of a quantity of changed system messages. In this way, when the value of ValueTag in the first indication information changes, the terminal device 302 determines that a system message needs to be updated, or if the value of ValueTag does not change, the terminal device 302 determines that a system message does not need to be updated.

Optional Solution 2

The first indication information includes (1+M) ValueTag fields. In the (1+M) ValueTag fields, one ValueTag field is used to indicate whether the second system message needs to be updated, M ValueTag fields are respectively corresponding to M normal third system messages, and each of the M ValueTag fields is used to indicate whether the corresponding normal third system message needs to be updated. Settings of the (1+M) ValueTag fields may be the same as those of ValueTag in the optional solution 1, and M is a positive integer.

In addition, the first indication information may further include N pieces of activation indication information, and the N pieces of activation indication information are respectively used to indicate whether each system message in N activation-related third system messages needs to be updated. When a value of the activation indication information is "1", it indicates that a system message needs to be updated, and when the value of the activation indication information is "0", it indicates that a system message does not need to be updated, and N is a positive integer.

Optional Solution 3

Optionally, the first indication information includes second indication information.

The second indication information is used to indicate a configuration version of a combination of the second system message and the at least one normal third system message that are currently used in the cell. In one system message update period, for an update on any one or more system messages in the second system message and the at least one normal third system message, the version changes once.

In step S502, after the terminal device 302 obtains the first indication information, if the configuration version indicated by the second indication information is different from a configuration version recorded by the terminal device 302, the terminal device 302 updates the second system message;

or if the configuration version indicated by the second indication information is the same as a configuration version recorded by the terminal device 302, the terminal device 302 determines that the second system message does not need to be updated. Optionally, the second indication information may also be implemented by using ValueTag.

Optionally, the second system message includes M pieces of third indication information that are respectively corresponding to M normal third system messages. The third indication information is used to indicate whether the corresponding normal third system message is updated relative to a latest change of the configuration version. After updating the second system message, the terminal device 302 obtains at least one piece of third indication information from the second system message.

Herein, there may be the following multiple cases in which the configuration version indicated by the second indication information is distinguished:

Case 1:

The configuration version indicated by the second indication information is different from the configuration version recorded by the terminal device 302, but there is no other different configuration version between the two configuration versions.

In case 1, if each piece of third indication information in the at least one piece of third indication information indicates that the corresponding normal third system message is not updated relative to the latest change of the configuration version, the terminal device 302 determines that no system message in the at least one normal third system message needs to be updated.

In case 1, if one or more pieces of third indication information in the at least one piece of third indication information indicate that the corresponding normal third system message is updated relative to the latest change of the configuration version, for each updated normal third system message, the terminal device 302 reads the normal third system message according to scheduling information that is of the normal third system message and that is in the updated second system message.

Case 2:

There is another different configuration version between the configuration version indicated by the second indication information and the configuration version recorded by the terminal device 302.

In case 2, for each normal third system message, the terminal device 302 reads the normal third system message according to scheduling information that is of the normal third system message and that is in the updated second system message.

In case 2, a reason that the terminal device 302 needs to update each normal third system message is: there is another different configuration version between the configuration version indicated by the second indication information and the configuration version recorded by the terminal device 302, and the second indication information is used to indicate the configuration version of the combination of the second system message and the at least one normal third system message that are currently used in the cell. This indicates that the terminal device 302 may have missed at least one tine of a system message update process. For example, if a normal third system message does not change relative to a previous configuration version, but changes relative to a configuration version earlier than the previous configuration version, a value of the corresponding third indication information is still "0". In this case, it is not accurate to determine, according to the third system message, whether the normal third system message needs to be updated. Therefore, to ensure validity of a stored system message, the terminal device 302 needs to update each normal third system message in case 2.

Optionally, in the optional solution 3, the first indication information may further include N pieces of fourth indication information, and the N pieces of fourth indication information are respectively corresponding to N activation-related third system messages and are used to indicate whether the terminal device in the cell needs to update the corresponding activation-related third system messages.

In this case, if the fourth indication information indicates that the terminal device in the cell needs to update the corresponding activation-related third system message, the terminal device 302 updates the corresponding activation-related third system message; or if the fourth indication information indicates that the terminal device in the cell does not need to update the corresponding activation-related third system message, the terminal device 302 determines that the corresponding activation-related third system message does not need to be updated.

It should be noted that the foregoing several optional solutions are merely examples for description. In Embodiment 1, when the terminal device 302 with a long DRX cycle updates a system message, the first system message indicates whether the terminal device 302 needs to update a system message, so that whether the terminal device 302 needs to update a system message is not indicated by using a paging message, where the first system message is periodically sent by the network device 301, and occupies a fixed physical resource location. In this way, even if the terminal device 302 cannot read the paging message in a timely manner, the system message can be updated in a timely manner.

The following describes the optional solution 3 by using an LTE system as an example and by using a procedure shown in FIG. 6A and FIG. 6B.

In the procedure shown in FIG. 6A and FIG. 6B, the first system message is an MIB message, the second system message is an SIB1 message, the at least one third system message is an SI message, and the at least one third system message is used to transmit an SIB other than an SIB1. The at least one third system message includes SI_NORM that is the normal third system message and SI_ACT that is the activation-related third system message. For example, an SIB14 in the LTE system is mainly used to implement an extended access barring (EAB) function. The terminal device 302 needs to read a related SIB only when the function is enabled.

Resource locations and quantities of repetitions of an MIB and the SIB1 are fixed.

The SIB other than the SIB1 is included in an SI message. An SI message may include one SIB, or may include multiple SIBs. If an SI message includes multiple SIBs, the multiple SIBs need to be SIBs of a same period and a same type. Optionally, an SI message formed by a normal SIB is referred to as a normal SI message, and an SI message formed by an activated SIB is referred to as an activated SI message.

The second indication information is ValueTag in the MIB, and a value of ValueTag increases by 1 each time the SIB1 and the normal SI message change (regardless of a quantity of changed messages in a modification period).

The SIB1 includes scheduling information and a period of an SI message, and specific SIBs included in the SI message. M pieces of third indication information are M SI_ACT_IND fields in the SIB1. If a value of SI_NORM- _IND is 0, it indicates that a corresponding normal third system message is not updated, and if the value of SI_NORM_IND is 1, it indicates that the corresponding normal third system message is updated. The M SI_NORM_IND fields may be implemented by using a bitmap. The bitmap includes at least M bits, and each bit is corresponding to one normal third system message.

N pieces of fourth indication information are N SI_ACT_IND fields in the MIB. If a value of SI_ACT_IND is 0, it indicates that a corresponding activation-related third system message does not need to be updated, and if the value of SI_ACT_IND is 1, it indicates that the corresponding activation-related third system message needs to be updated. The N SI_ACT_IND fields may also be implemented by using a bitmap. The bitmap includes at least N bits, and each bit is corresponding to one activation-related third system message.

The terminal device 302 maintains ValueTagMS, and a value of ValueTagMS is a value of recorded ValueTag read from the MIB in a last system information update.

A reason that ValueTag is used to indicate whether a system message needs to be updated is: when the terminal device 302 is in a sleep state, a system message may change multiple times. If the system message changes an even quantity of times, only one-bit information cannot indicate that the system message has changed. ValueTag is used to indicate change statuses of the second system message and the normal third system message or a change status of a combination thereof.

For an activation-related third system message, the terminal device 302 reads the activation-related third system message provided that corresponding activation indication information is set to "1", regardless of a change or a quantity of changes.

As shown in FIG. 6A and FIG. 6B, the procedure includes the following steps:

S601: A terminal device 302 in an idle state receives an MIB after the terminal device 302 wakes up from a sleep state, where optionally, a DRX cycle of the terminal device 302 is longer than a system information modification period.

S602: The terminal device 302 determines whether values of all SI_ACT_IND are 0, and if the values of all SI_ACT_IND are 0, performs step S603, or if values of some SI_ACT_IND are 1, performs step S604.

S603: The terminal device 302 determines that no SI_ACT needs to be read.

S604: The terminal device 302 determines whether a value of ValueTag in the MIB changes (that is, determines, by means of comparison, whether ValueTag in the read MIB is equal to a value of ValueTagMS recorded by the terminal device 302), and if the value of ValueTag changes, performs step S606, or if the value of ValueTag does not change, performs step S605.

S605: The terminal device 302 reads SI_ACT whose SI_ACT_IND value is 1 according to scheduling information in a recorded original SIB 1.

S606: The terminal device 302 reads an SIB1.

S607: The terminal device 302 reads SI_ACT whose SI_ACT_IND value is 1 according to scheduling information in the SIB1 read in step S606.

S608: The terminal device 302 determines whether a value of ValueTag in the MIB changes, and if the value of ValueTag does not change, performs step S609, or if the value of ValueTag changes, performs step S610.

S609: The terminal device 302 determines that an SIB1 does not need to be read or no SI_NORM needs to be read.

S610: The terminal device 302 determines whether the value of ValueTag in the MIB is 1 greater than a value of original ValueTag recorded by the terminal device 302 (that is, determines whether ValueTag read from the MIB=ValueTagMS+1), and if ValueTag is 1 greater than ValueTagMS, performs step S611, or otherwise (that is, ValueTag read from the MIB<ValueTagMS, or ValueTag read from the MIB>ValueTagMS+1), performs step S612.

S611: The terminal device 302 reads an SIB1, and reads all SI_NORM according to scheduling information of SI_NORM in the SIB1.

S612: Read an SIB1.

S613: The terminal device 302 determines whether values of all SI_NORM_IND in the SIB1 are 0, and if the values of all SI_NORM_IND are 0, performs step S614, or otherwise, performs step S615.

S614: The terminal device 302 determines that no SI_NORM needs to be read.

S615: The terminal device 302 reads SI_NORM whose SI_NORM_IND value is 1 according to scheduling information of SI_NORM whose SI_NORM_IND value in the read SIB1 is 1.

In Embodiment 2, when determining that a system message needs to be updated, the terminal device 302 may immediately read the system message, or read the system message in a next system message update period.

In Embodiment 2, a system message update solution is provided for a terminal device with a long DRX cycle (that is, a DRX cycle is longer than a system message update period). In this solution, the terminal device updates a system message according to the first indication information in the first system message, so that the terminal device with a long DRX cycle in an idle state can accurately obtain a system message change in a timely manner.

In addition, in an optional implementation solution, the network device adds the second indication information and the fourth indication information to the first system message, and adds the third indication information to the second system message, so that the terminal reads only a necessary system message when possible, thereby reducing energy consumption of the terminal device.

In some optional solutions, the third system messages are classified into a normal third system message and an activation-related third system message. The second indication information indicates changes of only the second system message and the normal third system message, and the separate fourth indication information is used to indicate a message change of the activation-related third system message. In this way, the terminal device reads only a necessary system message when possible, thereby reducing energy consumption of the terminal.

It should be noted that a problem of a system message update failure caused when a terminal device with a long DRX cycle cannot read a paging message in a timely manner can be resolved in Embodiment 2. However, Embodiment 2 may also be applied to a terminal device with a common DRX cycle, another system message update mechanism is provided, and an optional solution in the mechanism is used. For example, a network device sends second indication information, third indication information, and fourth indication information, so that a terminal device reads only a system message that needs to be updated, instead of reading all system messages. This can reduce energy consumption of the terminal device.

Embodiment 3

It should be noted that some indication information in Embodiment 3 is named the same as that in Embodiment 2, but they may indicate different meanings. Specific meanings are subject to descriptions in the embodiments.

As shown in FIG. 7, a system message update procedure provided in Embodiment 3 includes the following steps:

S701: A network device 301 sends a first system message in a cell.

S702: A terminal device 302 obtains first indication information from the first system message, where the first indication information is used to indicate whether a paging-related system message is updated, and if the first indication information indicates that the paging-related system message is not updated, performs step S703 and step S704.

S703: The terminal device 302 receives, according to a recorded paging-related system message, a paging message sent by the network device 301.

S704: The terminal device 302 updates a system message according to second indication information related to a system message update in the received paging message.

For the first system message, a second system message, and a third system message, refer to description of the foregoing basic concept part.

In the system message update solution provided in Embodiment 3, a problem of a system message update failure caused because a terminal device with long DRX cycle cannot read a paging message in a timely manner can be resolved. First, the terminal device 302 reads the first indication information from the first system message that is periodically sent and occupies a fixed resource, and determines, according to the first indication information, whether the paging-related system message changes. In this way, when determining that the paging-related system message does not change, the terminal device 302 can successfully receive the paging message, and further update a system message according to the second indication information in the paging message.

Optionally, the second indication information includes third indication information, fourth indication information, and at least one piece of fifth indication information.

The third indication information is used to indicate a configuration version of a combination of the second system message and the at least one third system message that are currently used in the cell. In one system message update period, for an update on any one or more system messages in the second system message and the at least one third system message, the configuration version changes once.

The fourth indication information is used to indicate whether the second system message is updated relative to a latest change of the configuration version.

One piece of fifth indication information is corresponding to one third system message and is used to indicate whether the corresponding third system message is updated relative to the latest change of the configuration version.

Optionally, if the configuration version indicated by the third indication information is the same as a configuration version recorded by the terminal device 302, a system message does not need to be updated; or if the configuration version indicated by the third indication information is different from a configuration version recorded by the terminal device 302, but there is no other different configuration version between the two configuration versions, when the fourth indication information indicates that the second system message is updated relative to the latest change of the configuration version, the terminal device 302 updates the second system message; or when the fourth indication information indicates that the second system message is not updated relative to the latest change of the configuration version, the terminal device 302 determines that the second system message does not need to be updated.

Optionally, if the configuration version indicated by the third indication information is different from the configuration version recorded by the terminal device 302, but there is no other different configuration version between the two configuration versions, when each piece of fifth indication information in the at least one piece of fifth indication information indicates that the corresponding third system message is not updated relative to the latest change of the configuration version, the terminal device 302 determines that no system message in the at least one third system message needs to be updated; or when one or more pieces of fifth indication information in the at least one piece of fifth indication information indicate that the corresponding third system message is updated relative to the latest change of the configuration version, the terminal device 302 updates each updated third system message.

Optionally, if the configuration version indicated by the third indication information is different from a configuration version recorded by the terminal device 302, but there is no other different configuration version between the two configuration versions, the terminal device 302 updates the second system message; and the terminal device 302 updates each third system message according to scheduling information that is of the at least one third system message and that is in the updated second system message.

Optionally, if the first indication information indicates that the paging-related system message is updated, the terminal device 302 updates the second system message; and obtains sixth indication information and at least one piece of seventh indication information from the second system message, where the sixth indication information is used to indicate a configuration version of a combination of the second system message and the at least one third system message that are currently used in the cell, and in one system message update period, for an update on any one or more system messages in the second system message and the at least one third system message, the configuration version changes once; and one piece of seventh indication information is corresponding to one third system message and is used to indicate whether the corresponding third system message is updated relative to a latest change of the configuration version; and the terminal device 302 updates a system message according to the sixth indication information and the at least one piece of seventh indication information.

Optionally, if the configuration version indicated by the sixth indication information is different from the configuration version recorded by the terminal device 302, but there is no other different configuration version between the two configuration versions, for each updated third system message indicated by the at least one piece of seventh indication information, the terminal device 302 updates the third system message; or if the configuration version indicated by the sixth indication information is different from the configuration version recorded by the terminal device 302, and there is another different configuration version between the two configuration versions, the terminal device 302 updates each system message in the at least one third system message.

The following describes the system message update solution provided in Embodiment 3 by using an LTE system as an example.

The first system message is an MIB message, the second system message is an SIB1 message, the at least one third system message is an SI message, and the at least one third system message is used to transmit an SIB other than an SIB1.

Resource locations and quantities of repetitions of an MIB and the SIB1 are fixed.

The SIB other than the SIB1 is included in an SI message. An SI message may include one SIB, or may include multiple SIBs. If an SI message includes multiple SIBs, the multiple SIBs need to be SIBs of a same period and a same type.

The first indication information is ValueTagPaging in the MIB, and a value of ValueTagPaging increases by 1 each time the paging-related system message changes.

The second indication information includes the third indication information, the fourth indication information, and the at least one piece of fifth indication information in the paging message.

The third indication information is ValueTag and is used to indicate a configuration version of a combination of an SIB1 message and at least one SI message that are currently used in the cell. In one system message update period, for an update on any one or more system messages in the SIB1 message and the at least one SI message, the configuration version changes once.

The fourth indication information is one-bit SIB1 change indication information and is used to indicate whether the SIIB1 is updated relative to a latest change of the configuration version.

The at least one piece of fifth indication information is K SI_IND fields. If a value of SI_IND is 0, it indicates that a corresponding SI message is not updated, and if the value of SI_IND is 1, it indicates that the corresponding SI message is updated. The K SI_IND fields may be implemented by using a bitmap. The bitmap includes at least K bits, and each bit is corresponding to one SI message.

The SIB1 includes the sixth indication information and the at least one piece of seventh indication information.

The sixth indication information is ValueTag in the SIB1, and a meaning of ValueTag in the SIB1 is the same as that of ValueTag in the paging message.

The at least one piece of seventh indication information is K SI_IND fields in the SIB1, and a meaning of the K SI_IND fields is the same as that of K SI_IND fields in the paging message.

The terminal device 302 maintains ValueTagMS and ValueTagPagingMS. A value of ValueTagPagingMS is a value of recorded ValueTagPaging that is read from the MIB in a last system message update, and a value of ValueTagMS is a value of recorded ValueTag that is read from the paging message or the second system message in the last system message update.

A reason that ValueTag is used to indicate whether a system message needs to be updated is: when the terminal device 302 is in a sleep state, a system message may change multiple times. If the system message changes an even quantity of times, only one-bit information cannot indicate that the system message has changed.

The following describes a system message update process by using the terminal device 302 in an idle state as an example.

After the terminal in an idle state wakes up from a sleep state, the terminal reads the MIB.

The following describes different cases according to different values of ValueTagPaging read from the MIB.

Case 1: ValueTagPagingMS=ValueTagPaging read from the MIB

The terminal device 302 receives the paging message. The following describes different values of ValueTag read from the paging message.

Subcase 1: ValueTag read from the paging message=ValueTagMS+1

In subcase 1 in case 1, if SIB1 change indication information read from the paging message indicates that the SIB1 changes, the terminal device 302 reads the SIB1. If K SI_IND fields read from the paging message indicate that an SI message changes, the terminal device 302 reads the changed SI message according to SI scheduling information in the SIB1, and sets ValueTagMS=ValueTag.

Subcase 2: ValueTag read from the paging message<ValueTagMS, or ValueTag read from the paging message>ValueTagMS+1

In subcase 2 in case 1, the terminal device 302 reads the SIB1, reads all SI messages again according to SI message scheduling information in the SIB1, and sets ValueTagMS=ValueTag.

Case 2: ValueTagPagingMS≠ValueTagPaging read from the MIB

In case 2, the terminal device 302 reads the SIB1, and there are the following two subcases according to a value of ValueTag read from the SIB1.

Subcase 1: ValueTag read from the SIB1=ValueTagMS+1

In subcase 1 in case 2, the terminal device 302 reads a changed SI message according to K SI_IND fields and SI scheduling information in the SIB1, and sets ValueTagMS=ValueTag read from the SIB.

Subcase 2: ValueTag read from the SIB1<ValueTagMS, or ValueTag read from the SIB1>ValueTagMS+1

In subcase 2 in case 2, the terminal device 302 reads all SI messages again, and sets ValueTagMS=ValueTag read from the SIB1.

In addition, in case 2, the terminal device 302 sets ValueTagPagingMS=ValueTagPaging read from the MIB.

In Embodiment 3, a system message update solution is provided for a terminal device with a long DRX cycle (that is, a DRX cycle is longer than a system message update period). In this solution, if a paging-related system message does not change, a terminal device in an idle state may obtain system message change information by using a paging message.

In addition, a mechanism for reading a system message by a terminal device is optimized in some solutions in Embodiment 3. Multiple pieces of indication information are carried in a paging message, and multiple pieces of indication information are carried in an SIB1 message, so that the terminal reads only a necessary system message when possible, to reduce energy consumption of the terminal.

It should be noted that although a problem that a terminal device with a long DRX cycle cannot normally update a system message can be resolved in Embodiment 3, a new system message update solution is further provided for a terminal device with a short DRX cycle, thereby improving a success rate of updating a system message.

Embodiment 4

As shown in FIG. 8, a system message update procedure provided in Embodiment 4 includes the following steps:

S801: A network device 301 sends a paging message in a cell.

S802: A terminal device 302 receives the paging message sent by the network device 301, and obtains system message update indication information from the paging message.

For each system message in a first system message, a second system message, and at least one third system message, the system message update indication information indicates whether the terminal device 302 needs to update the system message.

S803: The terminal device 302 updates a system message according to the obtained system message update indication information.

For the first system message, the second system message, and the third system message, refer to description of the foregoing basic concept part.

In both Embodiment 2 and Embodiment 3, a system message update problem of the terminal device 302 with a long DRX cycle can be resolved. In Embodiment 4, a new system message update solution is provided for the terminal device 302 with a short DRX cycle (a DRX cycle is not longer than a system message update period, and further, the system message update period may be an integer multiple of the DRX cycle). System message update indication information in a paging message is set for each system message, that is, system message update indication information is set for each system message in the first system message, the second system message, and the at least one third system message. Therefore, a change status of each system message can be precisely indicated. In this case, when the terminal device 302 updates a system message, the terminal device 302 needs to make an update only for a changed system message, thereby reducing device energy consumption.

Optionally, system message update indication information of each system message may be implemented by using a bitmap, and each bit is corresponding to one system message. When a bit is 0, it indicates that a corresponding system message does not change, and when the bit is 1, it indicates that the corresponding system message changes.

Optionally, the at least one third system message may include an activation-related third system message and a normal third system message. Optionally, for the first system message, the second system message, and the normal third system message, when corresponding system message update indication information is 1, the terminal device 302 may read a corresponding system message in a next system message update period. For the activation-related third system message, when corresponding system message update indication information is 1, the terminal device 302 may immediately read the activation-related third system message.

Embodiment 5

As shown in FIG. 9A, a system message transmission procedure provided in Embodiment 5 includes the following steps:

S901: For each to-be-sent system message, a network device 301 determines a start location, a sending period, and a quantity of repetitions that are used for sending the system message.

S902: A terminal device 302 determines a start location, a sending period, and a quantity of repetitions that are used for sending each to-be-received system message.

S903: For each to-be-sent system message, the network device 301 sends the system message according to the determined start location, sending period, and quantity of repetitions that are used for sending the system message; and the terminal device 302 receives the system message according to the determined start location, sending period, and quantity of repetitions that are used for sending each system message.

In a time interval between two times of sending a system message, one or more other system messages are included.

The solution provided in Embodiment 5 is applicable to any one of the foregoing embodiments. The network device 301 sends another system message in a process of two times of repeated sending. In this case, after receiving a system message, the terminal device 302 may receive the another system message without waiting a system message window, thereby improving system message update efficiency.

The following separately describes an optional solution 1 and an optional solution 2. The two optional solutions are compared to illustrate a specific implementation and an effect of Embodiment 4.

Optional solution 1: The network device 301 repeatedly sends a same system message in an SI window.

Optional solution 2: The network device 301 sends another system message in a time interval between two times of sending a system message.

The following describes the optional solution 1 with reference to FIG. 9B.

Optional Solution 1

An application scenario of the optional solution 1 is: to implement a coverage enhancement requirement in CIoT, the network device 301 needs to repeatedly send a same SI message in an SI window.

In the optional solution 1, it is assumed that a frequency-domain resource for SI message transmission is fixed, a modulation and coding scheme and the like are also fixed, and only time-domain scheduling needs to be performed.

Scheduling information carried in an SIB1 includes only a size of $SIn, n=1, 2, \ldots, N$ (according to a size $S_n$ of a system message SIn, a quantity $M_n$ of repetitions required for ensuring coverage enhancement may be learned) and a start frame number $T_0$ and a start subframe number $t_0$ for scheduling an SI message, where N is a positive integer.

In the optional solution 1, SI windows are sequentially arranged, and there is no overlap or spacing between the SI windows.

A quantity of subframes required for transmitting SIn, $n=1, 2, \ldots, N$ in a corresponding window $M_n$ times is $\lceil S_n M_n/r \rceil$, where r is a quantity of bits that can be transmitted in one subframe by using the fixed frequency-domain resource and the fixed modulation and coding scheme.

For $SIn, n=1, 2, \ldots, N$, a start frame number is $$T_0 + \mathrm{FLOOR}\left[\left(t_0 + \sum_{i=0}^{n-1} \lceil S_i M_i/r \rceil + \mathrm{offset}_i\right) \Big/ 10\right],$$

a start subframe number is $$\left(t_0 + \sum_{i=0}^{n-1} \lceil S_i M_i/r \rceil + \mathrm{offset}_i\right) \bmod 10,$$

an end frame number is $$T_0 + \mathrm{FLOOR}\left[\left(t_0 + \sum_{i=0}^{n} \lceil S_i M_i/r \rceil + \mathrm{offset}_i\right) \Big/ 10\right],$$

and an end subframe number is $$\left(t_0 + \sum_{i=0}^{n} \lceil S_i M_i / r \rceil + \text{offset}_i\right) \mod 10.$$

The terminal may receive SIn in the foregoing time-domain space, where offset$_i$ is an offset subframe quantity. Some used subframes in a system are fixed, for example, subframes for transmitting an MIB and an SIB1, and therefore, these subframes need to be sorted out. This rule is fixed for both the terminal device 302 and the network device 301, and a specific offset subframe quantity may be obtained by means of calculation according to a system design.

With reference to FIG. 9B, it may be learned from the foregoing description that in the optional solution 1, SI messages are sequentially scheduled in terms of time. For a terminal device with better coverage, SI may be obtained by performing just a few times of receiving, or even one time of repeated transmission. However, a system message is received only when repeated transmission of all previous system messages is completed. This is not beneficial to electricity saving of a terminal device (especially a terminal device with better coverage). Therefore, as shown in FIG. 9C, the optional solution 2 provides a system message sending solution using overlapped SI windows.

Optional Solution 2

In the optional solution 2, system messages SIn,n=1, 2, . . . , N are sequentially arranged in a unit of subframe, where N is a positive integer.

The terminal device 302 may receive SIn in a $(t_0+n+i*N-1+\text{offset}_{n,i})\mod 10^{th}$ subframe in a data frame whose frame number is $T_0+\text{FLOOR}\lfloor(t_0+n+i*N-1+\text{offset}_{n,i})/10\rfloor$, where i=0, 1, . . . , $\lceil S_n M_n/r \rceil$, and offset$_{n,i}$ and is an offset subframe quantity in an $i^{th}$ time of repeatedly sending SIn.

In the optional solution 2, for a terminal with better coverage, only several subframes may be required to receive a system message. For such a terminal, a scheduling solution in the optional solution 2 can implement resource positioning and enough repeated transmission performed for coverage enhancement, and is further beneficial to electricity saving of a terminal with a relatively high coverage level.

Embodiment 6

FIG. 10 is a schematic structural diagram of a first type of terminal device according to Embodiment 6 of this application. As shown in the figure, the device includes:

a receiving module 1001, configured to receive a first system message of a cell in which the terminal device is located; and a processing module 1002, configured to: obtain first indication information from the first system message received by the receiving module 1001, where the first indication information includes information used for updating system messages other than the first system message; and update the system messages other than the first system message according to the obtained first indication information.

The first system message is periodically sent, and occupies a fixed physical resource location.

Optionally, the system messages other than the first system message that are updated by the processing module 1002 include a second system message and at least two third system messages, and the at least two third system messages include at least one normal third system message and at least one activation-related third system message.

The second system message includes scheduling information of the at least two third system messages.

The activation-related third system message includes a system message that needs be obtained by the terminal device in the cell when a particular function of the cell is activated, and the normal third system message is a third system message in the at least two third system messages other than the activation-related third system message.

Optionally, when the first indication information includes second indication information, the second indication information is used to indicate a configuration version of a combination of the second system message and the at least one normal third system message that are currently used in the cell, and in one system message update period, for an update on any one or more system messages in the second system message and the at least one normal third system message, the configuration version changes once, the processing module 1002 is specifically configured to:

if the configuration version indicated by the second indication information is different from a configuration version recorded by the terminal device, update the second system message; or if the configuration version indicated by the second indication information is the same as a configuration version recorded by the terminal device, determine that the second system message does not need to be updated.

Optionally, the processing module 1002 is specifically configured to:

when the second system message includes at least one piece of third indication information, and one piece of third indication information is corresponding to one normal third system message and is used to indicate whether the corresponding normal third system message is updated relative to a latest change of the configuration version, obtain the at least one piece of third indication information from the second system message after the second system message is updated; and if the configuration version indicated by the second indication information is different from the configuration version recorded by the terminal device, but there is no other different configuration version between the two configuration versions, perform the following operation:

if each piece of third indication information in the at least one piece of third indication information indicates that the corresponding normal third system message is not updated relative to the latest change of the configuration version, determining that no system message in the at least one normal third system message needs to be updated; or if one or more pieces of third indication information in the at least one piece of third indication information indicate that the corresponding normal third system message is updated relative to the latest change of the configuration version, for each updated normal third system message, controlling, according to scheduling information that is of the normal third system message and that is in the updated second system message, the receiving module 1001 to read the normal third system message.

Optionally, the processing module 1002 is specifically configured to:

if there is another different configuration version between the configuration version indicated by the second indication information and the configuration version recorded by the terminal device, for each normal third system message, control, according to the scheduling information that is of the normal third system message and that is in the updated second system message, the receiving module 1001 to read the normal third system message.

Optionally, the processing module 1002 is specifically configured to:

when the first indication information further includes at least one piece of fourth indication information, and one piece of fourth indication information is corresponding to one activation-related third system message and is used to indicate whether the terminal device in the cell needs to update the corresponding activation-related third system message, if the fourth indication information indicates that the terminal device in the cell needs to update the corresponding activation-related third system message, update the corresponding activation-related third system message; or if the fourth indication information indicates that the terminal device in the cell does not need to update the corresponding activation-related third system message, determine that the corresponding activation-related third system message does not need to be updated.

For various optional implementations of the terminal device, refer to operations of the terminal device 302 in Embodiment 2. The receiving module 1001 is configured to perform a receiving operation of the terminal device 302, and the processing module 1002 is configured to perform a processing operation of the terminal device 302.

The receiving module 1001 may be implemented by a receiver, and the processing module 1002 may be implemented by a processor.

The terminal device may be configured to execute the method provided in Embodiment 10.

Embodiment 7

FIG. 11 is a schematic structural diagram of a second type of terminal device according to Embodiment 7 of this application. As shown in the figure, the device includes:

a receiver 1101, configured to receive a first system message of a cell in which the terminal device is located; and a processor 1102, configured to: obtain first indication information from the first system message received by the receiver 1101, where the first indication information includes information used for updating system messages other than the first system message; and update the system messages other than the first system message according to the obtained first indication information.

The first system message is periodically sent, and occupies a fixed physical resource location.

For various optional implementations of the receiver 1101, refer to the receiving module 1001, and for various optional implementations of the processor 1102, refer to the processing module 1002.

The terminal device may be configured to execute the method provided in Embodiment 10.

Embodiment 8

FIG. 12 is a schematic structural diagram of a first type of network device according to Embodiment 8 of this application. As shown in the figure, the device includes:

a processing module 1201, configured to determine a first system message, where the first system message includes first indication information, and the first indication information includes information used for updating system messages other than the first system message; and a sending module 1202, configured to send, in a cell, the first system message determined by the processing module 1201.

The first system message is periodically sent, and occupies a fixed physical resource location.

Optionally, the sending module 1202 is further configured to:

send the system messages other than the first system message in the cell.

The system messages other than the first system message include a second system message and at least two third system messages, and the at least two third system messages include at least one normal third system message and at least one activation-related third system message.

The second system message includes scheduling information of the at least two third system messages.

The activation-related third system message includes a system message that needs be obtained by a terminal device in the cell when a particular function of the cell is activated, and the normal third system message is a third system message in the at least two third system messages other than the activation-related third system message.

Optionally, the first indication information sent by the sending module 1202 includes second indication information.

The second indication information is used to indicate a configuration version of a combination of the second system message and the at least one normal third system message that are currently used in the cell. In one system message update period, for an update on any one or more system messages in the second system message and the at least one normal third system message, the configuration version changes once.

Optionally, the second system message sent by the sending module 1202 includes at least one piece of third indication information.

One piece of third indication information is corresponding to one normal third system message and is used to indicate whether the corresponding normal third system message is updated relative to a latest change of the configuration version.

Optionally, the first indication information sent by the sending module 1202 includes at least one piece of fourth indication information.

One piece of fourth indication information is corresponding to one activation-related third system message and is used to indicate whether the terminal device in the cell needs to update the corresponding activation-related third system message.

For another optional implementation of the network device, refer to operations of the network device 301 in Embodiment 2. The processing module 1201 is configured to perform a processing operation of the network device 301, and the sending module 1202 is configured to perform a sending operation of the network device 301.

The processing module 1201 may be implemented by a processor, and the sending module 1202 may be implemented by a transmitter.

The network device may be configured to execute the method provided in Embodiment 11.

Embodiment 9

FIG. 13 is a schematic structural diagram of a second type of network device according to Embodiment 9 of this application. As shown in the figure, the device includes:

a processor 1301, configured to determine a first system message, where the first system message includes first indication information, and the first indication information includes information used for updating system messages other than the first system message; and a transmitter 1302, configured to send, in a cell, the first system message determined by the processor 1301.

The first system message is periodically sent, and occupies a fixed physical resource location.

For another optional implementation of the processor 1301, refer to the processing module 1201, and for another optional implementation of the transmitter 1302, refer to the sending module 1202.

The network device may be configured to execute the method provided in Embodiment 11.

Embodiment 10

FIG. 14 is a flowchart of a first system message update method according to Embodiment 10 of this application. As shown in the figure, the procedure includes the following steps:

S1401: A first terminal device receives a first system message of a cell in which the first terminal device is located.

S1402: The first terminal device obtains first indication information from the first system message, where the first indication information includes information used for updating system messages other than the first system message.

S1403: The first terminal device updates the system messages other than the first system message according to the obtained first indication information.

The first system message is periodically sent, and occupies a fixed physical resource location.

Optionally, the system messages other than the first system message include a second system message and at least two third system messages, and the at least two third system messages include at least one normal third system message and at least one activation-related third system message.

The second system message includes scheduling information of the at least two third system messages.

The activation-related third system message includes a system message that needs be obtained by the terminal device in the cell when a particular function of the cell is activated, and the normal third system message is a third system message in the at least two third system messages other than the activation-related third system message.

Optionally, the first indication information includes second indication information.

The second indication information is used to indicate a configuration version of a combination of the second system message and the at least one normal third system message that are currently used in the cell. In one system message update period, for an update on any one or more system messages in the second system message and the at least one normal third system message, the configuration version changes once.

That the first terminal device updates the system messages other than the first system message according to the obtained first indication information includes:

if the configuration version indicated by the second indication information is different from a configuration version recorded by the first terminal device, the first terminal device updates the second system message; or if the configuration version indicated by the second indication information is the same as a configuration version recorded by the first terminal device, the first terminal device determines that the second system message does not need to be updated.

Optionally, the second system message includes at least one piece of third indication information, and one piece of third indication information is corresponding to one normal third system message and is used to indicate whether the corresponding normal third system message is updated relative to a latest change of the configuration version.

After the first terminal device updates the second system message, the procedure further includes: the first terminal device obtains the at least one piece of third indication information from the second system message.

That the first terminal device updates the system messages other than the first system message according to the obtained first indication information further includes:

if the configuration version indicated by the second indication information is different from the configuration version recorded by the first terminal device, but there is no other different configuration version between the two configuration versions, the first terminal device performs the following operation:

if each piece of third indication information in the at least one piece of third indication information indicates that the corresponding normal third system message is not updated relative to the latest change of the configuration version, determining that no system message in the at least one normal third system message needs to be updated; or if one or more pieces of third indication information in the at least one piece of third indication information indicate that the corresponding normal third system message is updated relative to the latest change of the configuration version, for each updated normal third system message, reading the normal third system message according to scheduling information that is of the normal third system message and that is in the updated second system message.

Optionally, that the first terminal device updates the system messages other than the first system message according to the obtained first indication information further includes:

if there is another different configuration version between the configuration version indicated by the second indication information and the configuration version recorded by the first terminal device, for each normal third system message, the first terminal device reads the normal third system message according to the scheduling information that is of the normal third system message and that is in the updated second system message.

Optionally, the first indication information further includes at least one piece of fourth indication information, and one piece of fourth indication information is corresponding to one activation-related third system message and is used to indicate whether the terminal device in the cell needs to update the corresponding activation-related third system message.

That the first terminal device updates the system messages other than the first system message according to the obtained first indication information further includes:

if the fourth indication information indicates that the terminal device in the cell needs to update the corresponding activation-related third system message, the first terminal device updates the corresponding activation-related third system message; or if the fourth indication information indicates that the terminal device in the cell does not need to update the corresponding activation-related third system message, the first terminal device determines that the corresponding activation-related third system message does not need to be updated.

For another optional implementation of the method, refer to processing of the terminal device 302 in Embodiment 2.

Embodiment 11

FIG. 15 is a flowchart of a second system message update method according to Embodiment 11 of this application. As shown in the figure, the procedure includes the following steps:

S1501: A network device determines a first system message, where the first system message includes first indication information, and the first indication information includes information used for updating system messages other than the first system message.

S1502: The network device sends the determined first system message in a cell.

The first system message is periodically sent, and occupies a fixed physical resource location.

Optionally, the procedure further includes:
the network device sends the system messages other than the first system message in the cell.

The system messages other than the first system message include a second system message and at least two third system messages, and the at least two third system messages include at least one normal third system message and at least one activation-related third system message.

The second system message includes scheduling information of the at least two third system messages.

The activation-related third system message includes a system message that needs be obtained by a terminal device in the cell when a particular function of the cell is activated, and the normal third system message is a third system message in the at least two third system messages other than the activation-related third system message.

Optionally, the first indication information includes second indication information.

The second indication information is used to indicate a configuration version of a combination of the second system message and the at least one normal third system message that are currently used in the cell. In one system message update period, for an update on any one or more system messages in the second system message and the at least one normal third system message, the configuration version changes once.

Optionally, the second system message includes at least one piece of third indication information.

One piece of third indication information is corresponding to one normal third system message and is used to indicate whether the corresponding normal third system message is updated relative to a latest change of the configuration version.

Optionally, the first indication information further includes at least one piece of fourth indication information.

One piece of fourth indication information is corresponding to one activation-related third system message and is used to indicate whether the terminal device in the cell needs to update the corresponding activation-related third system message.

For another optional implementation of the method, refer to processing of the network device 301 in Embodiment 2.

Embodiment 12

FIG. 16 is a schematic structural diagram of a third type of terminal device according to Embodiment 12 of this application. As shown in the figure, the device includes:

a receiving module 1601, configured to receive a first system message of a cell in which the terminal device is located, where system messages of the cell include the first system message, a second system message, and at least one third system message; the first system message is periodically sent, and occupies a fixed physical resource location; the second system message includes scheduling information of the at least one third system message; and the at least one third system message includes a paging-related system message; and a processing module 1602, configured to: obtain first indication information from the first system message received by the receiving module 1601, where the first indication information is used to indicate whether a paging-related system message is updated; and if the first indication information indicates that the paging-related system message is not updated, control the receiving module 1601 to receive a paging message according to a recorded paging-related system message, and update a system message according to second indication information related to a system message update in the paging message received by the receiving module 1601.

Optionally, the second indication information received by the receiving module 1601 includes third indication information, fourth indication information, and at least one piece of fifth indication information.

The third indication information is used to indicate a configuration version of a combination of the second system message and the at least one third system message that are currently used in the cell. In one system message update period, for an update on any one or more system messages in the second system message and the at least one third system message, the configuration version changes once.

The fourth indication information is used to indicate whether the second system message is updated relative to a latest change of the configuration version.

One piece of fifth indication information is corresponding to one third system message and is used to indicate whether the corresponding third system message is updated relative to the latest change of the configuration version.

Optionally, the processing module 1602 is specifically configured to:

if the configuration version indicated by the third indication information is the same as a configuration version recorded by the terminal device, determine that a system message does not need to be updated; or if the configuration version indicated by the third indication information is different from a configuration version recorded by the terminal device, but there is no other different configuration version between the two configuration versions, when the fourth indication information indicates that the second system message is updated relative to the latest change of the configuration version, update the second system message; or when the fourth indication information indicates that the second system message is not updated relative to the latest change of the configuration version, determine that the second system message does not need to be updated.

Optionally, the processing module 1602 is specifically configured to:

if the configuration version indicated by the third indication information is different from the configuration version recorded by the terminal device, but there is no other different configuration version between the two configuration versions, when each piece of fifth indication information in the at least one piece of fifth indication information indicates that the corresponding third system message is not updated relative to the latest change of the configuration version, determine that no system message in the at least one third system message needs to be updated; or when one or more pieces of fifth indication information in the at least one piece of fifth indication information indicate that the corresponding third system message is updated relative to the latest change of the configuration version, update each updated third system message.

Optionally, the processing module 1602 is specifically configured to:

if the configuration version indicated by the third indication information is different from a configuration version recorded by the terminal device, but there is no other different configuration version between the two configuration versions, update the second system message; and update each third system message according to scheduling information that is of the at least one third system message and that is in the updated second system message.

Optionally, the processing module 1602 is further configured to:

if the first indication information indicates that the paging-related system message is updated, update the second system message;

obtain sixth indication information and at least one piece of seventh indication information from the second system message, where the sixth indication information is used to indicate a configuration version of a combination of the second system message and the at least one third system message that are currently used in the cell, and in one system message update period, for an update on any one or more system messages in the second system message and the at least one third system message, the configuration version changes once; and one piece of seventh indication information is corresponding to one third system message and is used to indicate whether the corresponding third system message is updated relative to a latest change of the configuration version; and update a system message according to the sixth indication information and the at least one piece of seventh indication information.

Optionally, the processing module 1602 is specifically configured to:

if the configuration version indicated by the sixth indication information is different from the configuration version recorded by the terminal device, but there is no other different configuration version between the two configuration versions, for each updated third system message indicated by the at least one piece of seventh indication information, update the third system message; or if the configuration version indicated by the sixth indication information is different from the configuration version recorded by the terminal device, and there is another different configuration version between the two configuration versions, update each system message in the at least one third system message.

For various optional implementations of the terminal device, refer to operations of the terminal device 302 in Embodiment 3. The receiving module 1601 is configured to perform a receiving operation of the terminal device 302, and the processing module 1602 is configured to perform a processing operation of the terminal device 302.

The receiving module 1601 may be implemented by a receiver, and the processing module 1602 may be implemented by a processor.

The terminal device may be configured to execute the method provided in Embodiment 16.

Embodiment 13

FIG. 17 is a schematic structural diagram of a fourth type of terminal device according to Embodiment 13 of this application. As shown in the figure, the device includes:

a receiver 1701, configured to receive a first system message of a cell in which the terminal device is located, where system messages of the cell include the first system message, a second system message, and at least one third system message; the first system message is periodically sent, and occupies a fixed physical resource location; the second system message includes scheduling information of the at least one third system message; and the at least one third system message includes a paging-related system message; and a processor 1702, configured to: obtain first indication information from the first system message received by the receiver 1701, where the first indication information is used to indicate whether a paging-related system message is updated; and if the first indication information indicates that the paging-related system message is not updated, control the receiver 1701 to receive a paging message according to a recorded paging-related system message, and update a system message according to second indication information related to a system message update in the paging message received by the receiver 1701.

For another optional implementation of the receiver 1701, refer to the receiving module 1601, and for another optional implementation of the processor 1702, refer to the processing module 1602.

The terminal device may be configured to execute the method provided in Embodiment 16.

Embodiment 14

FIG. 18 is a schematic structural diagram of a third type of network device according to Embodiment 14 of this application. As shown in the figure, the device includes:

a processing module 1801, configured to determine a first system message, where the first system message includes first indication information, and the first indication information is used to indicate whether a paging-related system message is updated; and a sending module 1802, configured to send, in a cell, the first system message determined by the processing module 1801.

The processing module 1801 is further configured to determine a paging message, where the paging message includes second indication information related to a system message update.

The sending module 1802 is further configured to send, in the cell, the paging message determined by the processing module 1801.

System messages of the cell include the first system message, a second system message, and at least one third system message; the first system message is periodically sent, and occupies a fixed physical resource location; the second system message includes scheduling information of the at least one third system message; and the at least one third system message includes the paging-related system message.

Optionally, the second indication information in the paging message sent by the sending module 1802 includes third indication information, fourth indication information, and at least one piece of fifth indication information.

The third indication information is used to indicate a configuration version of a combination of the second system message and the at least one third system message that are currently used in the cell. In one system message update period, for an update on any one or more system messages in the second system message and the at least one third system message, the configuration version changes once.

The fourth indication information is used to indicate whether the second system message is updated relative to a latest change of the configuration version.

One piece of fifth indication information is corresponding to one third system message and is used to indicate whether the corresponding third system message is updated relative to the latest change of the configuration version.

Optionally, the second system message sent by the sending module 1802 includes sixth indication information and at least one piece of seventh indication information.

The sixth indication information is used to indicate a configuration version of a combination of the second system message and the at least one third system message that are currently used in the cell. In one system message update period, for an update on any one or more system messages in the second system message and the at least one third system message, the configuration version changes once.

One piece of seventh indication information is corresponding to one third system message and is used to indicate whether the corresponding third system message is updated relative to a latest change of the configuration version.

For another optional implementation of the network device, refer to operations of the network device 301 in Embodiment 3. The processing module 1801 is configured to perform a processing operation of the network device 301, and the sending module 1802 is configured to perform a sending operation of the network device 301.

The processing module 1801 may be implemented by a processor, and the sending module 1802 may be implemented by a transmitter.

The network device may be configured to execute the method provided in Embodiment 17.

Embodiment 15

FIG. 19 is a schematic structural diagram of a fourth type of network device according to Embodiment 15 of this application. As shown in the figure, the device includes:

a processor 1901, configured to determine a first system message, where the first system message includes first indication information, and the first indication information is used to indicate whether a paging-related system message is updated; and a transmitter 1902, configured to send, in a cell, the first system message determined by the processor 1901.

The processor 1901 is further configured to determine a paging message, where the paging message includes second indication information related to a system message update.

The transmitter 1902 is further configured to send, in the cell, the paging message determined by the processor 1901.

System messages of the cell include the first system message, a second system message, and at least one third system message; the first system message is periodically sent, and occupies a fixed physical resource location; the second system message includes scheduling information of the at least one third system message; and the at least one third system message includes the paging-related system message.

For another optional implementation of the processor 1901, refer to the processing module 1801, and for another optional implementation of the transmitter 1902, refer to the sending module 1802.

The network device may be configured to execute the method provided in Embodiment 17.

Embodiment 16

FIG. 20 is a flowchart of a third system message update method according to Embodiment 16 of this application. As shown in the figure, the procedure includes the following steps:

S2001: A first terminal device receives a first system message of a cell in which the first terminal device is located, where system messages of the cell include the first system message, a second system message, and at least one third system message; the first system message is periodically sent, and occupies a fixed physical resource location; the second system message includes scheduling information of the at least one third system message; and the at least one third system message includes a paging-related system message.

S2002: The first terminal device obtains first indication information from the first system message, where the first indication information is used to indicate whether a paging-related system message is updated.

S2003: If the first indication information indicates that the paging-related system message is not updated, the first terminal device receives a paging message according to a recorded paging-related system message; and the first terminal device updates a system message according to second indication information related to a system message update in the received paging message.

Optionally, the second indication information includes third indication information, fourth indication information, and at least one piece of fifth indication information.

The third indication information is used to indicate a configuration version of a combination of the second system message and the at least one third system message that are currently used in the cell. In one system message update period, for an update on any one or more system messages in the second system message and the at least one third system message, the configuration version changes once.

The fourth indication information is used to indicate whether the second system message is updated relative to a latest change of the configuration version.

One piece of fifth indication information is corresponding to one third system message and is used to indicate whether the corresponding third system message is updated relative to the latest change of the configuration version.

Optionally, that the first terminal device updates a system message according to second indication information related to a system message update in the received paging message includes:

if the configuration version indicated by the third indication information is the same as a configuration version recorded by the first terminal device, the first terminal device determines that a system message does not need to be updated; or if the configuration version indicated by the third indication information is different from a configuration version recorded by the first terminal device, but there is no other different configuration version between the two configuration versions, when the fourth indication information indicates that the second system message is updated relative to the latest change of the configuration version, the first terminal device updates the second system message; or when the fourth indication information indicates that the second system message is not updated relative to the latest change of the configuration version, the first terminal device determines that the second system message does not need to be updated.

Optionally, that the first terminal device updates a system message according to second indication information related to a system message update in the received paging message further includes:

if the configuration version indicated by the third indication information is different from the configuration version recorded by the first terminal device, but there is no other different configuration version between the two configuration versions, when each piece of fifth indication information in the at least one piece of fifth indication information indicates that the corresponding third system message is not updated relative to the latest change of the configuration version, the first terminal device determines that no system message in the at least one third system message needs to be updated; or when one or more pieces of fifth indication information in the at least one piece of fifth indication information indicate that the corresponding third system message is updated relative to the latest change of the configuration version, the first terminal device updates each updated third system message.

Optionally, that the first terminal device updates a system message according to second indication information related to a system message update in the received paging message includes:

if the configuration version indicated by the third indication information is different from a configuration version recorded by the first terminal device, but there is no other different configuration version between the two configuration versions, the first terminal device updates the second system message; and the first terminal device updates each third system message according to scheduling information that is of the at least one third system message and that is in the updated second system message.

Optionally, the procedure further includes:

if the first indication information indicates that the paging-related system message is updated, the first terminal device updates the second system message, and obtains sixth indication information and at least one piece of seventh indication information from the second system message, where the sixth indication information is used to indicate a configuration version of a combination of the second system message and the at least one third system message that are currently used in the cell, and in one system message update period, for an update on any one or more system messages in the second system message and the at least one third system message, the configuration version changes once; and one piece of seventh indication information is corresponding to one third system message and is used to indicate whether the corresponding third system message is updated relative to a latest change of the configuration version; and the first terminal device updates a system message according to the sixth indication information and the at least one piece of seventh indication information.

Optionally, that the first terminal device updates a system message according to the sixth indication information and the at least one piece of seventh indication information includes:

if the configuration version indicated by the sixth indication information is different from the configuration version recorded by the first terminal device, but there is no other different configuration version between the two configuration versions, for each updated third system message indicated by the at least one piece of seventh indication information, the first terminal device updates the third system message; or if the configuration version indicated by the sixth indication information is different from the configuration version recorded by the first terminal device, and there is another different configuration version between the two configuration versions, the first terminal device updates each system message in the at least one third system message.

For another optional implementation of the method, refer to operations of the terminal device 302 in Embodiment 3.

Embodiment 17

FIG. 21 is a flowchart of a fourth system message update method according to Embodiment 17 of this application. As shown in the figure, the procedure includes the following steps:

S2101: A network device determines a first system message, where the first system message includes first indication information, and the first indication information is used to indicate whether a paging-related system message is updated.

S2102: The network device sends the determined first system message in a cell.

S2103: The network device determines a paging message, where the paging message includes second indication information related to a system message update.

S2104: The network device sends the determined paging message in the cell.

System messages of the cell include the first system message, a second system message, and at least one third system message; the first system message is periodically sent, and occupies a fixed physical resource location; the second system message includes scheduling information of the at least one third system message; and the at least one third system message includes the paging-related system message.

A sequence between two steps S2101 and S2102 and two steps S2103 and S2104 is not limited. Steps S2101 and S2102 may be performed before steps S2103 and S2104, or steps S2103 and S2104 may be performed before steps S2101 and S2102.

Optionally, the second indication information includes third indication information, fourth indication information, and at least one piece of fifth indication information.

The third indication information is used to indicate a configuration version of a combination of the second system message and the at least one third system message that are currently used in the cell. In one system message update period, for an update on any one or more system messages in the second system message and the at least one third system message, the configuration version changes once.

The fourth indication information is used to indicate whether the second system message is updated relative to a latest change of the configuration version.

One piece of fifth indication information is corresponding to one third system message and is used to indicate whether the corresponding third system message is updated relative to the latest change of the configuration version.

Optionally, the second system message includes sixth indication information and at least one piece of seventh indication information.

The sixth indication information is used to indicate a configuration version of a combination of the second system message and the at least one third system message that are currently used in the cell. In one system message update period, for an update on any one or more system messages in the second system message and the at least one third system message, the configuration version changes once.

One piece of seventh indication information is corresponding to one third system message and is used to indicate whether the corresponding third system message is updated relative to a latest change of the configuration version.

For another optional implementation of the method, refer to operations of the network device 301 in Embodiment 3.

Embodiment 18

FIG. 22 is a schematic structural diagram of a fifth type of terminal device according to Embodiment 18 of this application. As shown in the figure, the device includes:

a receiving module 2201, configured to receive a paging message of a cell in which the terminal device is located, where the paging message includes system message update indication information, and for each system message in a first system message, a second system message, and at least one third system message, the system message update indication information indicates whether a terminal device in the cell in which the terminal device is located needs to update the system message; and a processing module 2202, configured to update a system message according to the system message update indication information received by the receiving module 2201.

The first system message is periodically sent, and occupies a fixed physical resource location.

The second system message includes scheduling information of the at least one third system message.

For another optional implementation of the terminal device, refer to operations of the terminal device 302 in Embodiment 4. The receiving module 2201 is configured to perform a receiving operation of the terminal device 302, and the processing module 2202 is configured to perform a processing operation of the terminal device 302.

The receiving module 2201 may be implemented by a receiver, and the processing module 2202 may be implemented by a processor.

The terminal device may be configured to execute the method provided in Embodiment 22.

Embodiment 19

FIG. 23 is a schematic structural diagram of a sixth type of terminal device according to Embodiment 19 of this application. As shown in the figure, the device includes:

a receiver 2301, configured to receive a paging message of a cell in which the terminal device is located, where the paging message includes system message update indication information, and for each system message in a first system message, a second system message, and at least one third system message, the system message update indication information indicates whether a terminal device in the cell in which the terminal device is located needs to update the system message; and a processor 2302, configured to update a system message according to the system message update indication information received by the receiver 2301.

The first system message is periodically sent, and occupies a fixed physical resource location.

The second system message includes scheduling information of the at least one third system message.

For another optional implementation of the receiver 2301, refer to the receiving module 2201, and for another optional implementation of the processor 2302, refer to the processing module 2202.

The terminal device may be configured to execute the method provided in Embodiment 22.

Embodiment 20

FIG. 24 is a schematic structural diagram of a fifth type of network device according to Embodiment 20 of this application. As shown in the figure, the device includes:

a processing module 2401, configured to determine a paging message, where the paging message includes system message update indication information; and a sending module 2402, configured to send, in a cell, the paging message determined by the processing module 2401.

For each system message in a first system message, a second system message, and at least one third system message, the system message update indication information indicates whether a terminal device in the cell needs to update the system message.

The first system message is periodically sent, and occupies a fixed physical resource location. The second system message includes scheduling information of the at least one third system message.

For another optional implementation of the network device, refer to operations of the network device 301 in Embodiment 4. The processing module 2401 is configured to perform a processing operation of the network device 301, and the sending module 2402 is configured to perform a sending operation of the network device 301.

The network device may be configured to execute the method provided in Embodiment 23.

Embodiment 21

FIG. 25 is a schematic structural diagram of a sixth type of network device according to Embodiment 21 of this application. As shown in the figure, the device includes:

a processor 2501, configured to determine a paging message, where the paging message includes system message update indication information; and a transmitter 2502, configured to send, in a cell, the paging message determined by the processor 2501.

For each system message in a first system message, a second system message, and at least one third system message, the system message update indication information indicates whether a terminal device in the cell needs to update the system message.

The first system message is periodically sent, and occupies a fixed physical resource location. The second system message includes scheduling information of the at least one third system message.

For another optional implementation of the processor 2501, refer to the processing module 2401, and for another optional implementation of the transmitter 2502, refer to the sending module 2402.

The network device may be configured to execute the method provided in Embodiment 23.

Embodiment 22

FIG. 26 is a flowchart of a fifth system message update method according to Embodiment 22 of this application. As shown in the figure, the procedure includes the following steps:

S2601: A first terminal device receives a paging message of a cell in which the first terminal device is located, where the paging message includes system message update indication information.

For each system message in a first system message, a second system message, and at least one third system message, the system message update indication information indicates whether a terminal device in the cell in which the first terminal device is located needs to update the system message.

S2602: The first terminal device updates a system message according to the system message update indication information.

The first system message is periodically sent, and occupies a fixed physical resource location.

The second system message includes scheduling information of the at least one third system message.

For another optional implementation of the method, refer to processing of the terminal device 302 in Embodiment 4.

Embodiment 23

FIG. 27 is a flowchart of a sixth system message update method according to Embodiment 23 of this application. As shown in the figure, the procedure includes the following steps:

S2701: A network device determines a paging message, where the paging message includes system message update indication information.

S2702: The network device sends the paging message in a cell.

For each system message in a first system message, a second system message, and at least one third system message, the system message update indication information indicates whether a terminal device in the cell needs to update the system message.

The first system message is periodically sent, and occupies a fixed physical resource location. The second system message includes scheduling information of the at least one third system message.

For another optional implementation of the method, refer to processing of the network device 301 in Embodiment 4.

Embodiment 24

FIG. 28 is a schematic structural diagram of a seventh type of terminal device according to Embodiment 24 of this application. As shown in the figure, the device includes:

a processing module 2801, configured to: determine that the terminal device needs to receive at least one system message, and for each system message in the at least one system message, determine a start location, a sending period, and a quantity of repetitions that are used for sending the system message by a network device; and a receiving module 2802, configured to: for each system message in the at least one system message, receive the system message according to the start location, the sending period, and the quantity of repetitions that are used for sending the system message by the network device and that are determined by the processing module 2801.

In a time interval between two times of sending a system message, one or more other system messages are sent by the network device.

For another optional implementation of the terminal device, refer to operations of the terminal device 302 in Embodiment 5. The processing module 2801 is configured to perform a processing operation of the terminal device 302, and the receiving module 2802 is configured to perform a receiving operation of the terminal device 302.

The processing module 2801 may be implemented by a processor, and the receiving module 2802 may be implemented by a receiver.

The terminal device may be configured to execute the method provided in Embodiment 28.

Embodiment 25

FIG. 29 is a schematic structural diagram of an eighth type of terminal device according to Embodiment 25 of this application. As shown in the figure, the device includes:

a processor 2901, configured to: determine that the terminal device needs to receive at least one system message, and for each system message in the at least one system message, determine a start location, a sending period, and a quantity of repetitions that are used for sending the system message by a network device; and a receiver 2902, configured to: for each system message in the at least one system message, receive the system message according to the start location, the sending period, and the quantity of repetitions that are used for sending the system message by the network device and that are determined by the processor 2901.

In a time interval between two times of sending a system message, one or more other system messages are sent by the network device.

For another optional implementation of the processor 2901, refer to the processing module 2801, and for another optional implementation of the receiver 2902, refer to the receiving module 2802.

The terminal device may be configured to execute the method provided in Embodiment 28.

Embodiment 26

FIG. 30 is a schematic structural diagram of a seventh type of network device according to Embodiment 26 of this application. As shown in the figure, the device includes:

a processing module 3001, configured to: determine that the network device needs to send at least one system message, and for each system message in the determined at least one system message, determine a start location, a sending period, and a quantity of repetitions that are used for sending the system message; and a sending module 3002, configured to: for each system message in the at least one system message determined by the processing module 3001, send the system message according to the determined start location, sending period, and quantity of repetitions that are used for sending the system message.

In a time interval between two times of sending a system message, one or more other system messages are sent.

For another optional implementation of the network device, refer to the network device 301 in Embodiment 5. The processing module 3001 is configured to perform a processing operation of the network device 301, and the sending module 3002 is configured to perform a sending operation of the network device 301.

The processing module 3001 may be implemented by a processor, and the sending module 3002 may be implemented by a transmitter.

The network device may be configured to execute the method provided in Embodiment 29.

Embodiment 27

FIG. 31 is a schematic structural diagram of an eighth type of network device according to Embodiment 27 of this application. As shown in the figure, the device includes:

a processor 3101, configured to: determine that the network device needs to send at least one system message, and for each system message in the determined at least one system message, determine a start location, a sending period, and a quantity of repetitions that are used for sending the system message; and a transmitter 3102, configured to: for each system message in the at least one system message determined by the processor 3101, send the system message according to the determined start location, sending period, and quantity of repetitions that are used for sending the system message.

In a time interval between two times of sending a system message, one or more other system messages are sent.

For another optional implementation of the processor 3101, refer to the processing module 3001, and for another optional implementation of the transmitter 3102, refer to the sending module 3002.

The network device may be configured to execute the method provided in Embodiment 29.

Embodiment 28

FIG. 32 is a flowchart of a seventh system message transmission method according to Embodiment 28 of this application. As shown in the figure, the procedure includes the following steps:

S3201: A first terminal device determines that at least one system message needs to be received.

S3202: For each system message in the at least one system message, the first terminal device determines a start location, a sending period, and a quantity of repetitions that are used for sending the system message by a network device.

S3203: For each system message in the at least one system message, the first terminal device receives the system message according to the determined start location, sending period, and quantity of repetitions that are used for sending the system message by the network device.

In a time interval between two times of sending a system message, one or more other system messages are sent by the network device.

For another optional implementation of the method, refer to operations of the terminal device 302 in Embodiment 5.

Embodiment 29

FIG. 33 is a flowchart of an eighth system message transmission method according to Embodiment 29 of this application. As shown in the figure, the procedure includes the following steps:

S3301: A network device determines that at least one system message needs to be sent.

S3302: For each system message in the at least one system message, the network device determines a start location, a sending period, and a quantity of repetitions that are used for sending the system message.

S3303: For each system message in the at least one system message, the network device sends the system message according to the determined start location, sending period, and quantity of repetitions that are used for sending the system message.

In a time interval between two times of sending a system message, one or more other system messages are sent.

For another optional implementation of the method, refer to operations of the network device 301 in Embodiment 5.

In conclusion, according to one aspect, this application provides a system message update solution. In this solution, a network device adds indication information to a to-be-sent first system message, and after receiving the first system message, a terminal device updates system messages other than the first system message according to the indication information. The first system message is periodically sent, and occupies a fixed physical resource location.

In this solution, the indication information is sent in the first system message instead of a paging message. The terminal device may update the system messages other than the first system message according to the indication information, thereby updating all system messages. In comparison with a current solution in which a system message change is learned by using a paging message, it is avoided that the terminal device may fail to receive a paging message used for indicating a system message change and further cannot update a system message because a DRX cycle of the terminal device is longer than a system message modification period.

According to another aspect, this application provides another system message update solution. In this solution, system messages sent by a network device include a first system message, a second system message, and at least one third system message. The first system message is periodically sent, and occupies a fixed physical resource location; the second system message includes scheduling information of the at least one third system message; and the at least one third system message includes a paging-related system message. When sending the first system message, the network device adds indication information to the first system message, and the indication information is used to indicate whether the paging-related system message in the third system message is updated. If the indication information indicates that the paging-related system message is not updated, a terminal device receives a paging message according to a recorded paging-related system message, and updates a system message according to indication information related to a system message update in the received paging message.

In this solution, the first system message periodically sent by the network device indicates whether the paging-related system message is updated. If the paging-related system message is not updated, the terminal device may still normally receive the paging message according to the recorded paging-related system message, so as to further obtain the indication information related to a system message update from the paging message, and update a system message according to the indication information obtained from the paging message. In this way, even if a DRX cycle is longer than a system message update period, because it is learned that the system message related to the paging message is not updated, the terminal device can still correctly receive the paging message according to the recorded paging-related system message, so as to successfully obtain the indication information related to a system message update from the paging message, and successfully update a system message.

According to still another aspect, this application provides still another system message update solution. This solution is applied to a scenario in which a paging message can be normally received. For example, a system message update period is an integer multiple of a DRX cycle. In this solution, when a network device sends a paging message, for a first system message, a second system message, and at least one third system message, system message update indication information carried in the paging message indicates whether a first terminal device needs to update the system message; and the terminal device updates a system message according to the system message update indication information. The first system message is periodically sent, and occupies a fixed physical resource location; and the second system message includes scheduling information of the at least one third system message.

In this solution, indication information for each system message is carried in a paging message, and the indication information is used to indicate whether the corresponding system message needs to be updated. The terminal device may determine, according to a specific status of each piece of indication information, how to update a system message. For example, if indication information of a second system message indicates that the second system message does not need to be updated, when updating at least one third system message, a terminal device performs an update only according to a recorded second system message without reading the second system message again, thereby improving system message update efficiency of the terminal device.

According to yet another aspect, this application provides a system message sending solution. When sending a system message, a network device sends one or more other system messages in an entire time interval between two times of sending a system message.

Currently, each system message can be sent in only one SI window (SI-window), and may be sent in the system message window multiple times. An SI window of a system message is adjacent to an SI window of another system message. However, only one system message can be sent in one SI window. After receiving a system message in an SI window, a terminal device needs to wait for a next SI window to receive a next system message. In the solution provided in this application, the network device further sends another system message in a process of repeatedly sending a system message twice. In this case, after receiving a system message, the terminal device may receive another system message without waiting a system message window, thereby improving system message update efficiency.

Persons skilled in the art should understand that the embodiments of the present application may be provided as a method, a system, or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

What is claimed is:

1. A method performed by a terminal device in a long term evolution (LTE) system for obtaining system information (SI) provided by a base station, the method comprising:
receiving from the base station a first master information block message containing a master information block (MIB), wherein the system information includes the MIB, a system information block 1 (SIB1), and additional system information blocks including an activation-related SIB and a plurality of non-activation-related SIBs, the activation-related SIB being related to a network function being enabled or disabled by the base station, and the MIB includes a first indication indicating that the network function is enabled;
reading the first indication from the MIB;
determining that the network function is enabled according to the first indication read from the MIB;
in response to determining that the network function is enabled, receiving from the base station a first SI message containing the activation-related SIB;
implementing the network function according to the activation-related SIB;
receiving from the base station a SIB1 message containing the SIB1, wherein the SIB1 includes a plurality of second indications, each of the plurality of second indications corresponds to one of a plurality of second SI messages including one or more non-activation-related SIBs of the plurality of non-activation-related SIBs, and the each of the plurality of second indications indicates whether the corresponding second SI message is updated;
reading the plurality of second indications from the SIB1;
determining that one of the plurality of second indications indicates a second SI message corresponding to the one of the plurality of second indications is updated;
in response to determining that the second SI message is updated, receiving from the base station the second SI message; and updating information stored at the terminal device with information in one or more non-activation-related SIBs included in the second SI message.

2. The method according to claim 1, further comprising:
detecting a physical downlink control channel (PDCCH) signaling indicating schedule information of a SIB1 message containing the SIB1;
receiving the SIB1 message from the base station according to the schedule information of the SIB1 message; and
reading from the SIB1, scheduling information of the first SI message;
wherein the step of receiving the first SI message is according to the scheduling information of the first SI message.

3. The method according to claim 2, wherein the system information includes a system information block 14 (SIB14), and wherein the activation-related SIB is the SIB14, and the network function is an extended access barring (EAB) function.

4. The method according to claim 1, further comprising:
receiving from the base station a second MIB message containing the MIB;
after receiving the second MIB message, reading a third indication from the MIB, wherein the third indication indicates a version of the SIB1 and the non-activation-related SIB, and in one system information modification period the version is changed once if the SIB1 or the non-activation-related SIB is updated by the base station in the one system information modification period;
determining that a value of the third indication read from the MIB is different from a value of the third indication stored at the terminal device;
detecting a PDCCH signaling indicating schedule information of the SIB1 message;
receiving the SIB1 message from the base station according to the schedule information of the SIB1 message; and
updating information stored at the terminal device with information in the SIB 1.

5. A terminal device for operating in a long term evolution (LTE) system, comprising:
a transmitter;
a receiver; and
a processor configured to perform operations of:
receiving from a base station a first mater information block message containing a master information block (MIB), wherein the MIB is a portion of system information (SI) of the base station, and the system information includes the MIB, a system information block 1 (SIB1), and additional system information blocks including an activation-related SIB and a plurality of non-activation-related SIBs, the activation-related SIB being related to a network function being enabled or disabled by the base station, and the MIB includes a first indication indicating that the network function is enabled;
reading the first indication from the MIB;
determining that the network function is enabled according to the first indication read from the MIB,
in response to the determining that the network function is enabled, receiving from the base station a first SI message containing the activation-related SIB;
implementing the network function according to the activation-related SIB;
receiving from the base station a SIB1 message containing the SIB1, wherein the SIB1 includes a plurality of second indications, each of the plurality of second indications corresponds to one of a plurality of second SI messages including one or more non-activation-related SIBs of the plurality of non-activation-related SIBs, and the each of the plurality of second indications indicates whether the corresponding second SI message is updated;
reading the plurality of second indications from the SIB1;
determining that one of the plurality of second indications indicates a second SI message corresponding to the one of the plurality of second indications is updated;
in response to determining that the second SI message is updated, receiving from the base station the second SI message;
updating information stored at the terminal device with information in one or more non-activation-related SIBs included in the second SI message.

6. The terminal device according to claim 5, wherein the processor is further configured to perform operations of:
detecting a physical downlink control channel (PDCCH) signaling indicating schedule information of a SIB1 message including the SIB1;
receiving the SIB1 message from the base station according to the schedule information of the SIB1 message; and
reading from the SIB1 scheduling information of the first SI message,
wherein the receiving of the first SI message is according to the scheduling information of the first SI message.

7. The terminal device according to claim 6, wherein the system information includes a system information block 14 (SIB14), and wherein the activation-related SIB is the SIB14, and the network function is an extended access barring (EAB) function.

8. The terminal device according to claim 5, wherein the processor is further configured to perform operations of:
receiving from the base station a second MIB message containing the MIB;
after receiving the second MIB message, reading a third indication from the MIB, wherein the third indication indicates a version of the SIB1 and the non-activation-related SIB, and in one system information modification period the version is changed once if the SIB1 or the non-activation-related SIB is updated by the base station in the one system information modification period;
determining that a value of the third indication read from the MIB is different from a value of the third indication stored at the terminal device;
detecting a PDCCH signaling indicating schedule information of the SIB1 message;
receiving the SIB1 message from the base station according to the schedule information of the SIB1 message; and
updating information stored at the terminal device with information included in the SIB 1.

* * * * *